(12) United States Patent
Choi et al.

(10) Patent No.: US 8,396,034 B2
(45) Date of Patent: Mar. 12, 2013

(54) METHOD FOR DETERMINING CELL IDENTITY IN WIRELESS COMMUNICATION SYSTEM AND APPARATUS THEREFOR

(75) Inventors: Jin Soo Choi, Anyang-si (KR); Han Gyu Cho, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 357 days.

(21) Appl. No.: 12/819,072

(22) Filed: Jun. 18, 2010

(65) Prior Publication Data

US 2011/0044268 A1 Feb. 24, 2011

Related U.S. Application Data

(60) Provisional application No. 61/236,159, filed on Aug. 24, 2009, provisional application No. 61/236,530, filed on Aug. 25, 2009, provisional application No. 61/237,277, filed on Aug. 26, 2009, provisional application No. 61/237,281, filed on Aug. 26, 2009, provisional application No. 61/237,279, filed on Aug. 26, 2009, provisional application No. 61/238,215, filed on Aug. 31, 2009.

(30) Foreign Application Priority Data

Mar. 25, 2010 (KR) ........................ 10-2010-0026776

(51) Int. Cl.
*H04J 11/00* (2006.01)
*H04J 9/00* (2006.01)
*H04L 12/16* (2006.01)
*H04L 12/28* (2006.01)
*H04L 12/56* (2006.01)
*H04Q 11/00* (2006.01)
*H04Q 1/20* (2006.01)
*H04W 4/00* (2009.01)
*H04W 72/00* (2009.01)
*H04B 1/00* (2006.01)
*H04B 3/46* (2006.01)
*H04B 17/00* (2006.01)
*H04K 1/10* (2006.01)

(52) U.S. Cl. ........ 370/329; 370/203; 370/204; 370/207; 370/208; 370/210; 370/259; 370/328; 370/330; 370/395.3; 375/150; 375/227; 375/260; 455/452.1; 455/435.1

(58) Field of Classification Search .................. 370/203, 370/204, 207, 208, 210, 259, 328, 329, 330, 370/395.3; 375/150, 227, 260; 455/452.1, 455/435.1
See application file for complete search history.

(56) References Cited

U.S. PATENT DOCUMENTS

| | | | |
|---|---|---|---|
| 2005/0036539 A1* | 2/2005 | Niederholz et al. | 375/150 |
| 2006/0274843 A1* | 12/2006 | Koo et al. | 375/260 |
| 2007/0217495 A1* | 9/2007 | Han et al. | 375/227 |
| 2007/0217552 A1 | 9/2007 | Lee et al. | |
| 2007/0230590 A1 | 10/2007 | Choi et al. | |
| 2007/0291730 A1 | 12/2007 | Monfet et al. | |
| 2009/0190465 A1* | 7/2009 | Porat et al. | 370/210 |

\* cited by examiner

*Primary Examiner* — Andrew Lai
*Assistant Examiner* — Albert Shih
(74) *Attorney, Agent, or Firm* — Lee, Hong, Degerman, Kang & Waimey

(57) ABSTRACT

A method of determining a cell identity in a wireless communication system is disclosed. The present invention includes the steps of obtaining a segment ID and a sequence index from an SA-preamble (secondary advanced preamble) sequence received from a base station and determining the cell identity using the segment ID and the sequence index. In this case, the cell identity corresponds to one SA-preamble sequence and a cell identity adjacent to the cell identity corresponds to an SA-preamble sequence having a complex conjugate relation of the one SA-preamble sequence.

10 Claims, 12 Drawing Sheets

In case of Segment ID = 0

In case of Segment ID = 1

METHOD FOR DETERMINING CELL IDENTITY IN WIRELESS COMMUNICATION SYSTEM AND APPARATUS THEREFOR

This application claims the benefit of U.S. Provisional Patent Application Nos. 61/236,159, filed on Aug. 24, 2009, 61/236,530, filed on Aug. 25, 2009, 61/237,277, filed on Aug. 26, 2009, 61/237,281, filed on Aug. 26, 2009, 61/237,279, filed on Aug. 26, 2009, 61/238,215, filed on Aug. 31, 2009 and Korean Patent Application No. 10-2010-0026776, filed on Mar. 25, 2010, which is hereby incorporated by reference as if fully set forth herein.

BACKGROUND OF THE INVENTION

1. Field of the Invention

The present invention relates to a wireless communication system, and more particularly, to a method of determining a cell identity in a wireless communication system and apparatus therefor.

2. Discussion of the Related Art

First of all, FIG. 1 exemplarily shows a wireless communication system. Referring to FIG. 1, a wireless communications system 100 consists of a plurality of base stations 110 and a plurality of mobile stations 120. The wireless communications system 100 can include a homogeneous network or a heterogeneous network. In this case, the heterogeneous network represents the network in which different network entities including macro cells, femto cells, relays and the like coexist. The base station is a fixed station that communicates with a mobile station in general. And, the base stations 110a, 110b and 110c provide services to specific geographical areas 102a, 102b and 102c, respectively. In order to enhance system performance, each of the specific geographical areas can be further divided into a plurality of smaller regions 104a, 104b and 104c for example. Each of the smaller areas can be named a cell, a sector or a segment. In IEEE 802.16e system, a cell identity (cell_ID or IDCell) is given with reference to a whole system. On the contrary, a sector or segment identity is given with reference to a specific area in which each base station provides a service and has a value set to one of 0 to 2. The mobile station 120 is distributed in the wireless communication system in general and is fixed or movable. Each of the mobile stations is able to communicate with at least one base station at a random moment in uplink ((UL) or downlink (DL). A base station and a mobile station are able to communicate with each other using one of CDMA (code division multiple access) system, FDMA (frequency division multiple access) system, TDMA (time division multiple access) system, SC-FDMA (single carrier frequency division multiple access) system, MC-FDMA (multi carrier frequency division multiple access) system, OFDMA (orthogonal frequency division multiple access) system, a combination thereof and the like. In this disclosure, 'uplink' indicates a communication link from a mobile station to a base station. And, 'downlink' indicates a communication link from a base station to a mobile station.

SUMMARY OF THE INVENTION

Accordingly, the present invention is directed to a method of determining a cell identity in a wireless communication system and apparatus therefor that substantially obviate one or more of the problems due to limitations and disadvantages of the related art.

An object of the present invention is to provide a method of determining a cell identity in a wireless communication system and apparatus therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, a method of determining a cell identity in a wireless communication system includes the steps of obtaining a segment ID and a sequence index from an SA-preamble (secondary advanced preamble) sequence received from a base station and determining the cell identity using, the segment ID and the sequence index, wherein the cell identity corresponds to one SA-preamble sequence and wherein a cell identity adjacent to the cell identity corresponds to an SA-preamble sequence having a complex conjugate relation of the one SA-preamble sequence.

Preferably, the cell identity is determined by a following formula: IDcell=256*n+Idx (wherein the n is the segment ID and has a value set to 0, 1 or 2, wherein the Idx is determined by $$2 \cdot \mod(q, 128) + \left\lfloor \frac{q}{128} \right\rfloor,$$

and wherein the q is a sequence index and has an integer vale ranging from 0 to 255).

More preferably, the SA-preamble sequence of a sequence index x corresponding to one segment ID has a complex conjugate relation with the SA-preamble sequence of a sequence index x+128 corresponding to the one segment ID.

More preferably, the sequence indexes are partitioned according to a cell type. In this case, the cell type includes a macro ABS (advanced base station), a public ABS and a CSG (closed subscriber group) femto ABS.

To further achieve these and other advantages and in accordance with the purpose of the present invention, a mobile station device includes a receiving module receiving an SA-preamble (secondary advanced preamble) sequence received from a base station and a processor determining the cell identity using a segment ID and a sequence index included in the received SA-preamble sequence, wherein the cell identity corresponds to one SA-preamble sequence and wherein a cell identity adjacent the cell identity corresponds to an SA-preamble sequence having a complex conjugate relation of the one SA-preamble sequence.

Preferably, the cell identity is determined by a following formula: IDcell=256*n+Idx (wherein the n is the segment ID and has a value set to 0, 1 or 2, wherein the Idx is determined by $$2 \cdot \mod(q, 128) + \left\lfloor \frac{q}{128} \right\rfloor,$$

and wherein the q is a sequence index and has an integer vale ranging from 0 to 255).

More preferably, SA-preamble sequences of sequence indexes 0 to 127 corresponding to one segment ID have complex conjugate relations with SA-preamble sequences of sequence indexes 128 to 255 corresponding to the one segment ID, respectively.

More preferably, the sequence indexes are partitioned according to a cell type. In this case, the cell type includes a macro ABS (advanced base station), a public ABS and a CSG (closed subscriber group) femto ABS.

Accordingly, the present invention provides the following effects or advantages.

First of all, the present invention is able to determine a cell identity more efficiently in IEEE 802.16m wireless communication system.

Secondly, the present invention is able to efficiently detect a cell identity using an SA-preamble (secondary advanced preamble) received from a base station.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. First of all, embodiments of the present invention in the following description are examples for applying the technical features of the present invention are applied to a system that uses a plurality of orthogonal subcarriers. For clarity and convenience of the following description, the present invention is described using IEEE 802.16 system for example. And, the present invention is applicable to various wireless communication system including 3GPP (3rd Generation Partnership Project) system.

Figure 1:
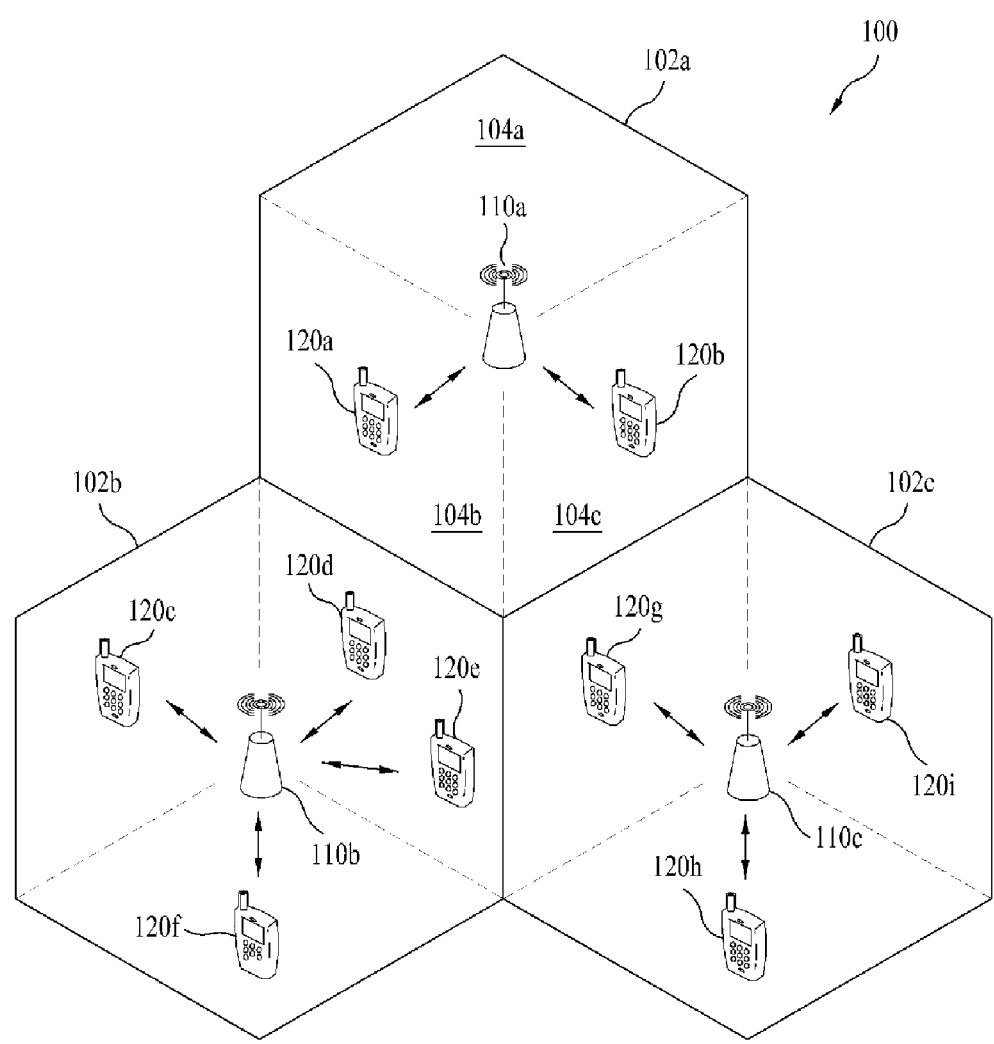
FIG. 1 is a diagram of an example for a wireless communication system.
Figure 2:
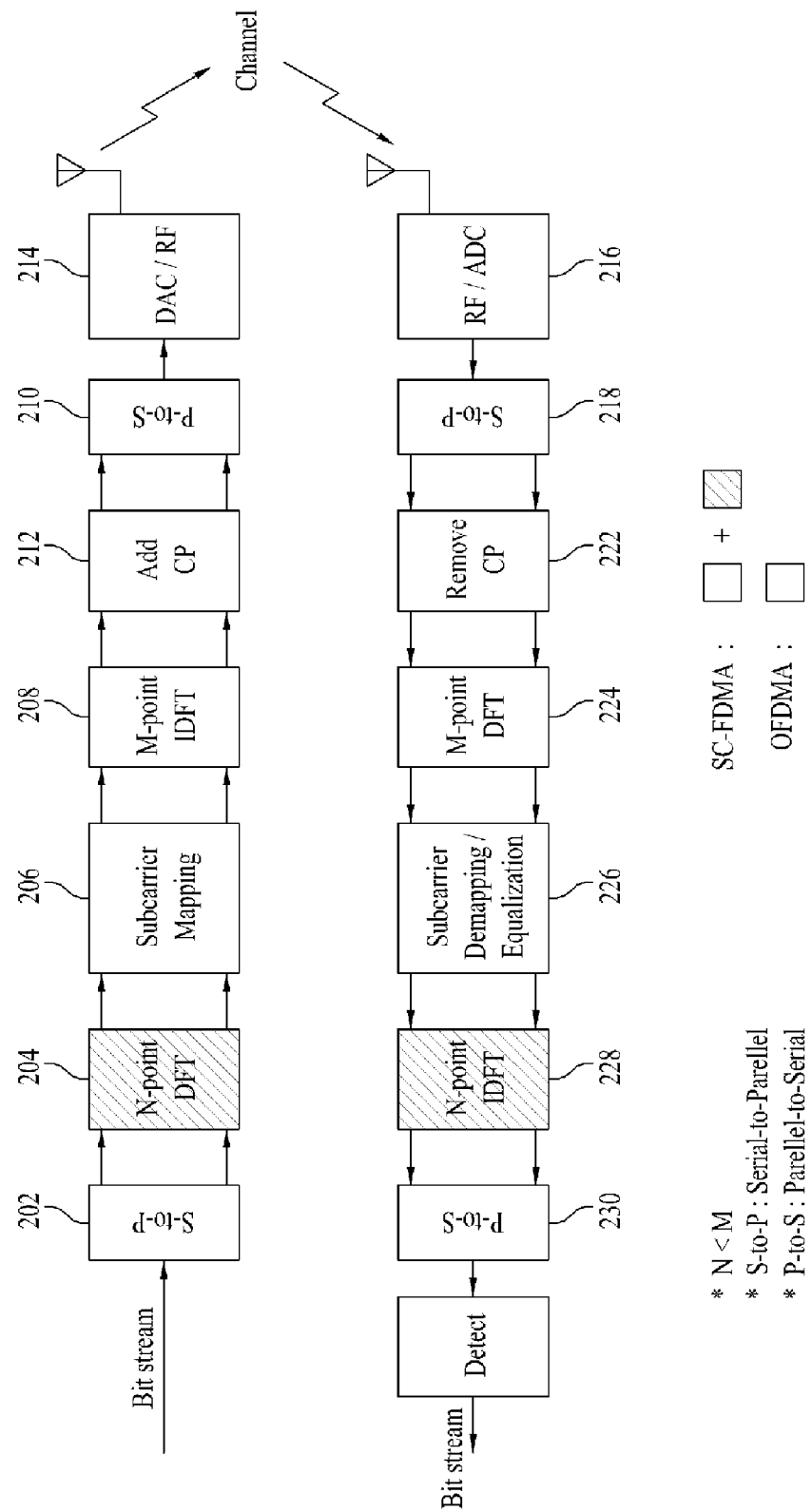
FIG. 2 is a block diagram of an example for a transmitter and receiver for OFDMA and SC-FDMA.

FIG. 2 is a block diagram for an example of a transmitter and receiver for OFDMA and SC-FDMA. In uplink, a transmitter may include a part of a mobile station and a receiver may include apart of a base station. In downlink, a transmitter may include a part of a base station and a receiver may include a part of a mobile station.

Referring to FIG. 2, an OFDMA transmitter includes a Serial to Parallel converter 202, a subcarrier mapping module 206, an M-point IDFT (Inverse Discrete Fourier Transform) module 208, a cyclic prefix (CP) adding module 210, a Parallel to Serial converter 212 and an RF/DAC (Radio Frequency/Digital to Analog) converter module 214.

A signal processing process in an OFDMA transmitter is described as follows. First of all, a bitstream is modulated into a data symbol sequence. Particularly, it is able to obtain the bitstream by performing various signal processings including channel encoding, interleaving, scrambling and the like on a data block delivered from a MAC (medium access control) layer. A bitstream is often called a codeword and is equivalent to a data block received from a MAC layer. And, the data block received from the MAC layer can be called a transport block as well. Modulation scheme is non-limited by the above description and can include one of BPSK (Binary Phase Shift Keying), QPSK (Quadrature Phase Shift Keying), n-QAM (n-Quadrature Amplitude Modulation) and the like. Subsequently, a serial data symbol sequence is converted to N data symbols in parallel [202]. The N data symbols are mapped to N subcarriers allocated among total M subcarriers and the (M−N) remaining subcarriers are padded with 0 [206]. The data symbol mapped in a frequency domain is transformed into a time-domain sequence through M-point IDFT processing [208]. Afterwards, in order to reduce inter-symbol interference (ISI) and inter-carrier interference (ICI), OFDMA symbol is generated by adding a cyclic prefix to the time-domain sequence [210]. The generated OFDMA symbol is converted from parallel to serial [s21]. The OFDMA symbol is then transmitted to a receiver through digital-to-analog conversion, frequency uplink transform and the like [214]. And, available subcarriers among the (M−N) remaining subcarriers are allocated to another user. Meanwhile, an OFDMA receiver includes an RF/ADC (radio frequency/analog to digital converter) module 216, a serial to parallel converter 218, a CP removing (CP remove) module 220, an M-point DFT (discrete Fourier transform) module 224, a subcarrier demapping/equalization module 226, a parallel to serial converter 228 and a detection module 230. A signal processing process of the OFDMA receiver has a configuration in reverse to that of the OFDMA transmitter.

Meanwhile, compared to the OFDMA transmitter, an SC-FDMA transmitter further includes an N-point DFT module 204 behind the subcarrier mapping module 206. The SC-FDMA transmitter spreads a plurality of data in a frequency domain through DFT prior to IDFT processing, thereby considerably decreasing a PAPR (peak-to-average power ratio) into a level lower than that of OFDMA system. Compared to the OFDMA receiver, an SC-FDMA receiver further includes an N-point IDFT module 228 next to the subcarrier demapping module 226. And, a signal processing process of the SC-FDMA receiver has a configuration in reverse to that of the SC-FDMA transmitter.

The modules exemplarily shown in FIG. 2 are provided for the above description only. The transmitter and/or the receiver can further include at least one necessary module. The modules/functionality can be omitted in part or may be separable into different modules/functionality. At least two of the modules can be integrated into one module.

Figure 3:
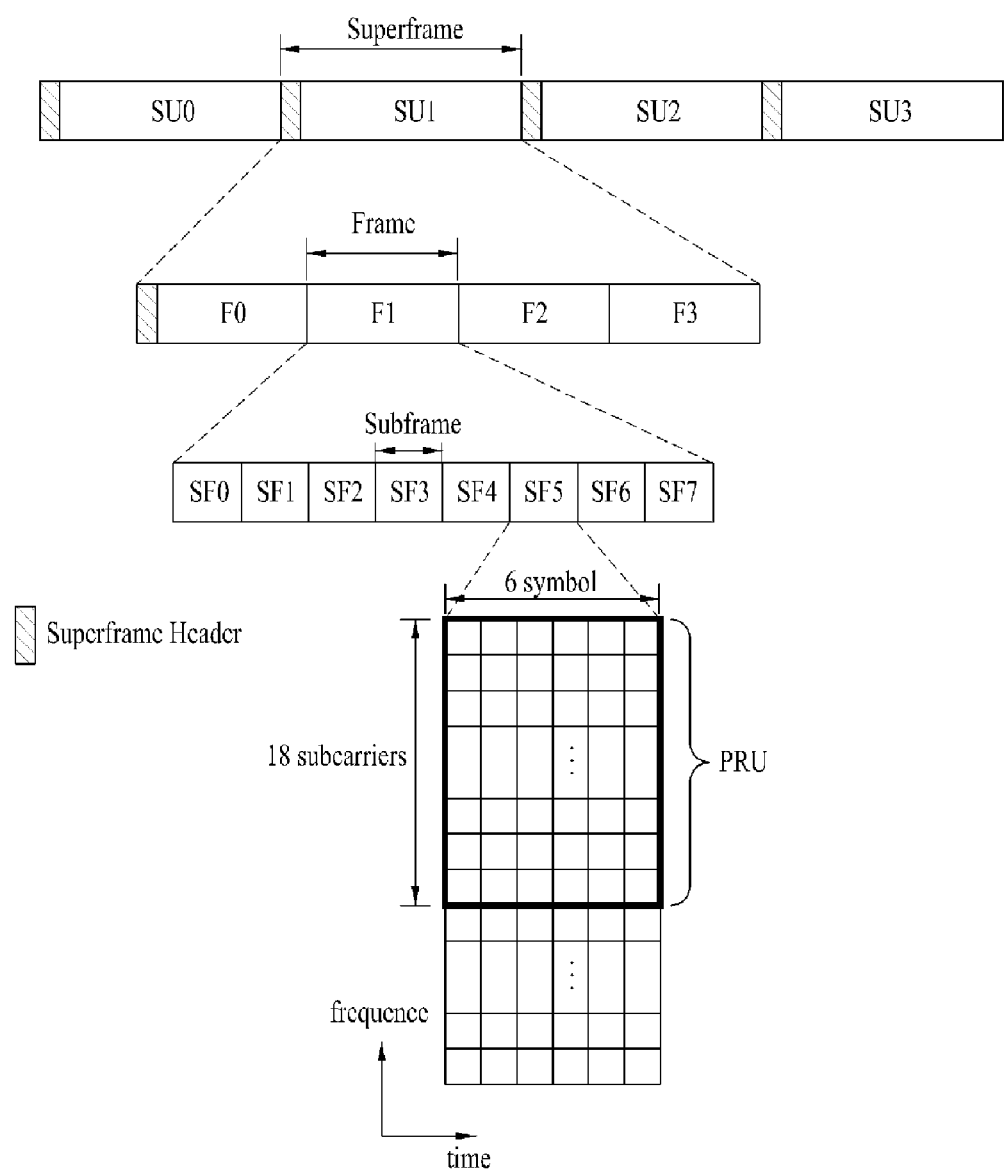
FIG. 3 is a diagram of a structure of a radio frame according to a duplex mode in an IEEE 802.16m system.

FIG. 3 is a diagram for an example of a radio frame structure in IEEE 802.16m system.

Referring to FIG. 3, a radio frame structure includes 20 ms-superframs SU0 to SU3 capable of supporting 5 MHz, 8.75 MHz, 10 MHz or 20 MHz. The superframe includes 4 5 ms-frames F0 to F3 equal to each other in size and starts with a superframe header (SFH). The superframe header carries an essential system parameter and system configuration information.

A frame includes 8 subframes SF0 to SF7. The subframe is allocated to downlink or uplink transmission. The subframe includes a plurality of OFDM symbols in time domain or includes a plurality of subcarriers in frequency domain. The OFDM symbol can be called OFDMA symbol, SC-FDMA symbol or the like according to a multiple access system. The number of OFDM symbols included in a subframe can be variously modified according to a channel bandwidth, a CP length and the like.

OFDM symbol includes a plurality of subcarriers. And, the number of the subcarriers is determined according to a size of FFT (fast Fourier transform). Types of subcarriers can be classified into a data subcarrier for data transmission, a pilot subcarrier for channel measurement, and a null subcarrier for a guard band and a DC component.

Parameters for characterizing an OFDM symbol include BW, $N_{used}$, n, G, etc. The BW is a nominal channel bandwidth. The $N_{used}$ is the number of subcarriers used for signal transmission. The n is a sampling factor and determines subcarrier spacing and a useful symbol time together with BW and $N_{used}$. And, the G indicates a ratio of a CP type to a useful time.

Table 1 shows examples of OFDMA parameters.

TABLE 1

| | | 5 | 7 | 8.75 | 10 | 20 |
|---|---|---|---|---|---|---|
| The nominal channel bandwidth, BW (MHz) | | 5 | 7 | 8.75 | 10 | 20 |
| Sampling factor, n | | 28/25 | 8/7 | 8/7 | 28/25 | 28/25 |
| Sampling frequency, $F_s$ (MHz) | | 5.6 | 8 | 10 | 11.2 | 22.4 |
| FFT size, $N_{FFT}$ | | 512 | 1024 | 1024 | 1024 | 2048 |
| Subcarrier spacing, Δf (kHz) | | 10.94 | 7.81 | 9.77 | 10.94 | 10.94 |
| Useful symbol time, $T_b$ (μs) | | 91.4 | 128 | 102.4 | 91.4 | 91.4 |
| CP ratio, G = 1/8 | OFDMA symbol time, $T_s$ (μs) | 102.857 | 144 | 115.2 | 102.857 | 102.857 |
| | FDD Number of OFDMA symbols per 5 ms frame | 48 | 34 | 43 | 48 | 48 |
| | Idle time (μs) | 62.857 | 104 | 46.40 | 62.857 | 62.857 |
| | TDD Number of OFDMA symbols per 5 ms frame | 47 | 33 | 42 | 47 | 47 |
| | TTG + RTG (μs) | 165.714 | 248 | 161.6 | 165.714 | 165.714 |
| CP ratio, G = 1/16 | OFDMA symbol time, $T_s$ (μs) | 97.143 | 136 | 108.8 | 97.143 | 97.143 |
| | FDD Number of OFDMA symbols per 5 ms frame | 51 | 36 | 45 | 51 | 51 |
| | Idle time (μs) | 45.71 | 104 | 104 | 45.71 | 45.71 |
| | TDD Number of OFDMA symbols per 5 ms frame | 50 | 35 | 44 | 50 | 50 |
| | TTG + RTG (μs) | 142.853 | 240 | 212.8 | 142.853 | 142.853 |
| CP ratio, G = 1/4 | OFDMA symbol time, $T_s$ (μs) | 114.286 | 160 | 128 | 114.286 | 114.286 |
| | FDD Number of OFDMA symbols per 5 ms frame | 43 | 31 | 39 | 43 | 43 |
| | Idle time (μs) | 85.694 | 40 | 8 | 85.694 | 85.694 |
| | TDD Number of OFDMA symbols per 5 ms frame | 42 | 30 | 38 | 42 | 42 |
| | TTG + RTG (μs) | 199.98 | 200 | 136 | 199.98 | 199.98 |
| Number of Guard Sub-Carriers | Left | 40 | 80 | 80 | 80 | 160 |
| | Right | 39 | 79 | 79 | 79 | 159 |
| Number of Used Sub-Carriers | | 433 | 865 | 865 | 865 | 1729 |
| Number of Physical Resource Unit (18 × 6) in a type-1 sub-frame. | | 24 | 48 | 48 | 48 | 96 |

Figure 4:
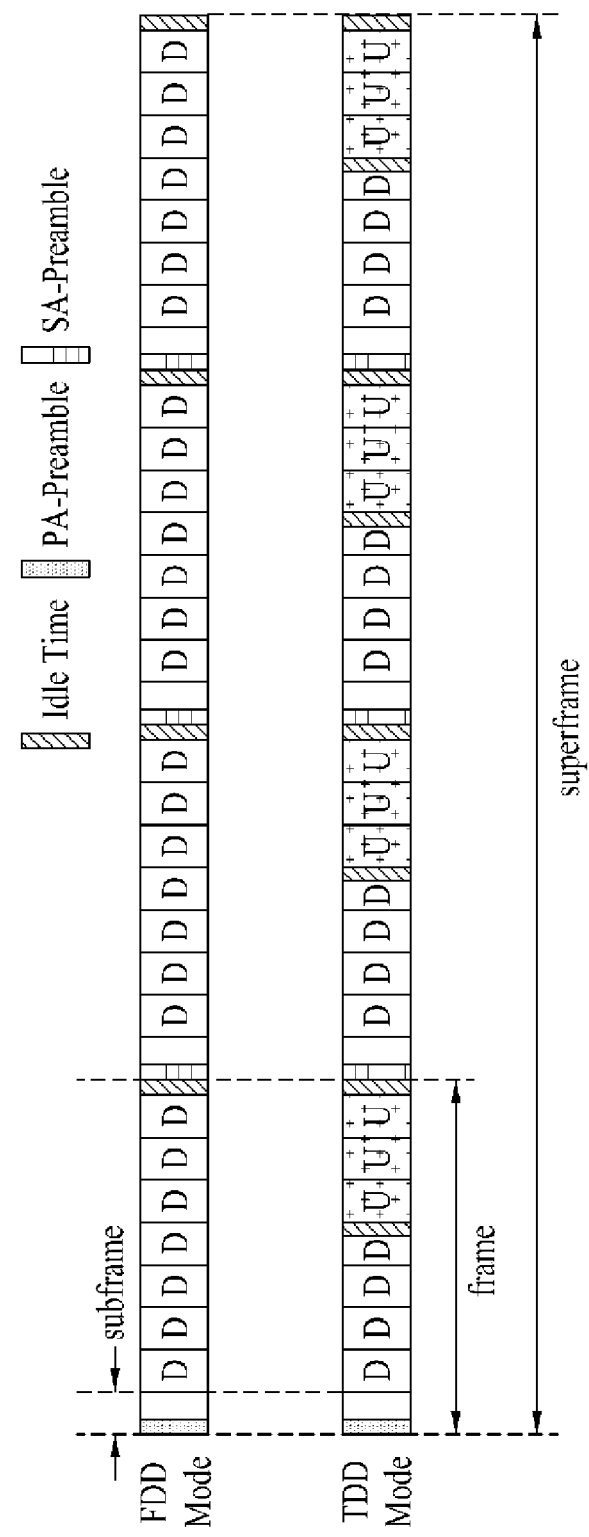
FIG. 4 is a diagram of an example for transmitting a synchronization channel in an IEEE 802.16m system.

FIG. 4 is a diagram of an example for transmitting a synchronization channel in an IEEE 802.16m system.

Referring to FIG. 4, in an IEEE 802.16m system, 4 synchronization channels are carried on one super frame SU1~SU4. In the IEEE 802.16m system, a downlink synchronization channel includes a primary synchronization channel and a secondary synchronization channel. The primary synchronization channel includes a PA-preamble (primary advanced preamble). And, the secondary synchronization channel includes an SA-preamble (secondary advanced preamble). In FDD or TDD mode, a downlink synchronization channel can be transmitted via a first OFDMA symbol of a frame.

The PA-preamble is normally used to obtain partial information such as communication system frequency bandwidth information, subcarrier setting information and the like. The SA-preamble is normally used to obtain a cell identity and can be used for such a usage as RSSI (received signal strength indication) measurement and the like. The PA-preamble is transmitted via a $1^{st}$ frame FO, while the SA-preamble can be transmitted via $2^{nd}$ to $4^{th}$ frames FO1 to FO3.

Figure 5:
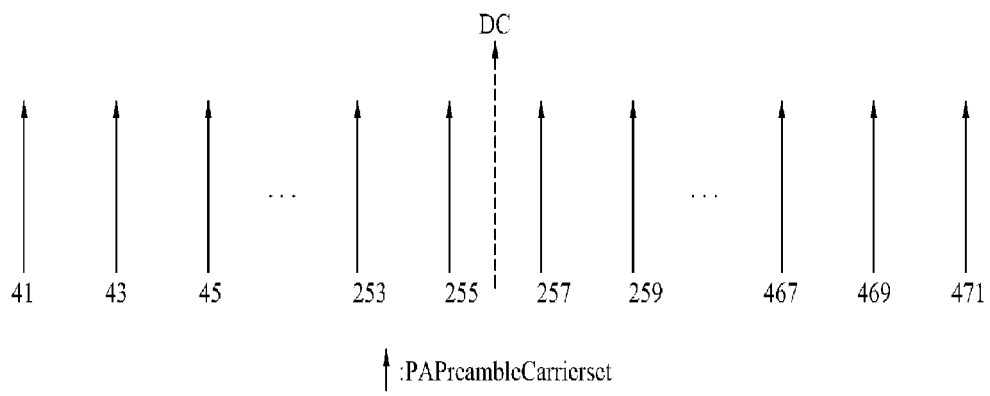
FIG. 5 is a diagram of an example for a subcarrier having a PA-preamble mapped thereto.

FIG. 5 is a diagram of an example for a subcarrier having a PA-preamble mapped thereto.

Referring to FIG. 5, a length of a PA-preamble is 216 and is irrelevant to an FFT size. The PA-preamble is inserted by an interval of 2 subcarriers and the rest sections are padded with zeros. For instance, the PA-preamble can be inserted in the subcarriers 41, 43, ..., 469 and 471. The PA-preamble is able to carry system bandwidth information, subcarrier setting information and the like. If the subcarrier index 256 is reserved as DC, the subcarrier having a sequence mapped thereto can be determined using Formula 1.

$$PAPreambleCarrierSet = 2 \times k + 41 \quad \text{[Formula 1]}$$

In Formula 1, 'k' indicates an integer ranging from 0 to 215. For example, a QPSK type sequence having a length 216 proposed in Table 2 is usable for the PA-preamble.

TABLE 2

| Index | Carrier | BW | Series to modulate |
|---|---|---|---|
| 0 | Fully configured | 5 MHz | 6DB4F3B16BCE59166C9CEF7C3C8CA5EDFC16A9D1DC01F2AE6AA08F |
| 1 | | 7, 8.75 and 10 MHz | 1799628F3B9F8F3B22C1BA19EAF94FEC4D37DEE97E027750D298AC |
| 2 | | 20 MHz | 92161C7C19BB2FC0ADE5CEF3543AC1B6CE6BE1C8DCABDDD319EAF7 |
| 3 | | Reserved | 6DE116E665C395ADC70A89716908620868A60340BF35ED547F8281 |
| 4 | | Reserved | BCFDF60DFAD6B027E4C39DB20D783C9F467155179CBA31115E2D04 |
| 5 | | Reserved | 7EF1379553F9641EE6ECDBF5F144287E329606C616292A3C77F928 |
| 6 | | Reserved | 8A9CA262B8B3D37E3158A3B17BFA4C9FCFF4D396D2A93DE65A0E7C |
| 7 | | Reserved | DA8CE648727E4282780384AB53CEEBD1CBF79E0C5DA7BA85DD3749 |
| 8 | | Reserved | 3A65D1E6042E8B8AADC701E210B5B4B650B6AB31F7A918893FB04A |
| 9 | | Reserved | D46CF86FE51B56B2CAA84F26F6F204428C1BD23F3D888737A0851C |
| 10 | Partially configured | N/A | 640267A0C0DF11E475066F1610954B5AE55E189EA7E72EFD57240F |

Figure 6:
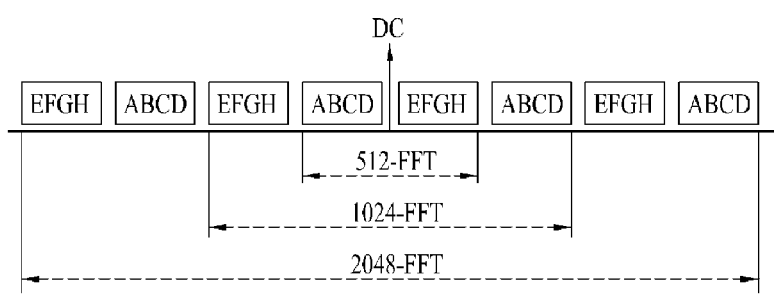
FIG. 6 is a diagram of an example for mapping an SA-preamble to a frequency domain.

FIG. 6 is a diagram of an example for mapping an SA-preamble to a frequency domain.

Referring to FIG. 6, the number of subcarriers allocated to an SA-preamble can vary according to an FFT size. For instance, a length of the SA-preamble can be 144 for 512-FFT, a length of the SA-preamble can be 288 for 1024-FFT, and a length of the SA-preamble can be 576 for 2048-FFT. In case that $256^{th}$, $512^{th}$, and $1,024^{th}$ subcarriers are reserved as DC components for 512-FFT, 1024-FTT and 2048-FFT, respectively, the subcarriers allocated to the SA-preamble can be determined by Formula 2.

$$SAPreambleCarrierSet_n = n + 3 \cdot k + 40 \cdot \frac{N_{SAP}}{144} + \left\lfloor \frac{2 \cdot k}{N_{SAP}} \right\rfloor \quad \text{[Formula 2]}$$

In Formula 2, the n is an SA-preamble carrier set index, is set to a value of 0, 1 or 2, and indicates a segment ID. The $N_{SAP}$ indicates the number of subcarriers allocated to an SA-preamble. And, the k indicates an integer raging from 0 to $N_{SAP}-1$.

Each cell has a cell identity (IDCell) represented as an integer ranging from 0 to 767. The cell identity is defined as a segment index and an index given to each segment. Generally, the cell identity can be determined by Formula 3.

$$IDCell = 256 \times n + q \quad \text{[Formula 3]}$$

In Formula 3, the n is an SA-preamble carrier set index, is set to a value of 0, 1 or 2, and indicates a segment ID. The q is an SA-preamble sequence index and indicates an integer ranging from 0 to 255.

In case of 512-FFT, a 288-bit SA-preamble is divided into 8 subblocks A, B, C, D, E, F, G and H. And, a length of each of the subblocks is 36 bits. Each segment ID has a different sequence subblock.

The SA-preamble defined in the 802.16m system shall be described in detail later. In case of the 512-FFT, the A, B, C, D, E, F, G and H are sequentially modulated and then mapped to the SA-preamble subcarrier set corresponding to the segment ID. When an FFT size increases, the basic blocks A, B, C, D, E, F, G and H are repeated in the same order. For instance, in case of 1024-FFT, E, F, G, H, A, B, C, D, E, F, G, H, A, B, C and D are sequentially modulated and then mapped to the SA-preamble subcarrier set corresponding to the segment ID.

Figure 7:
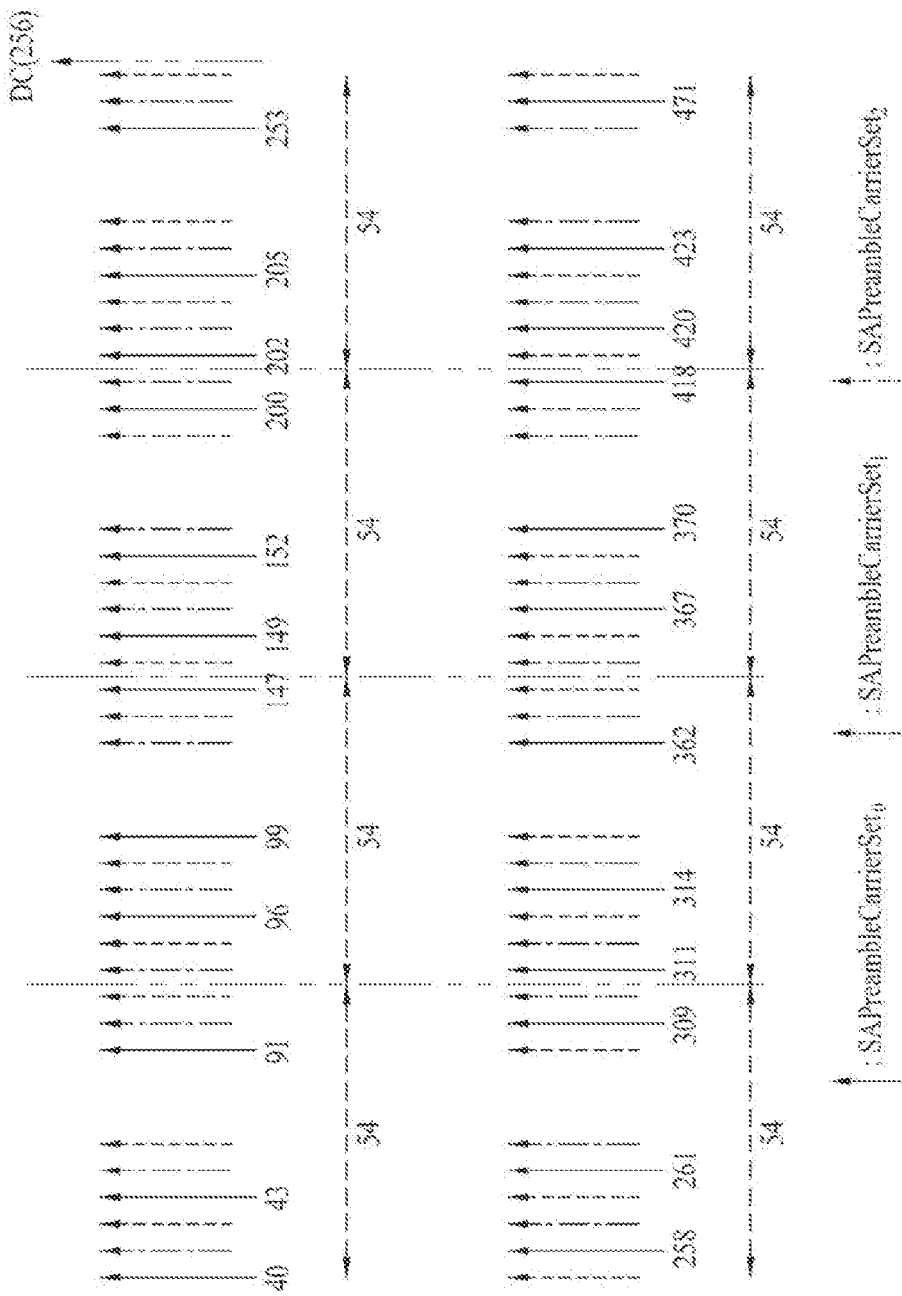
FIG. 7 is a diagram of an example for an SA-preamble structure in frequency domain for 512-FFT.

A circular shift is applicable to 3 contiguous subcarriers after the subcarrier mapping according to Formula 2. Each subblock has the same offset and a circular shift pattern for each subblock becomes [2, 1, 0, ..., 2, 1, 0, ..., 2, 1, 0, 2, 1, 0, DC, 1, 0, 2, 1, 0, 2, ..., 1, 0, 2, ..., 1, 0, 2]. FIG. 7 shows an example for an SA-preamble structure in frequency domain for 512-FFT. In case of the 512-FFT size, blocks A, B, C, D, E, F, G and H can experience right circular shifts of (0, 2, 1, 0, 1, 0, 2, 1), respectively.

Figure 8:
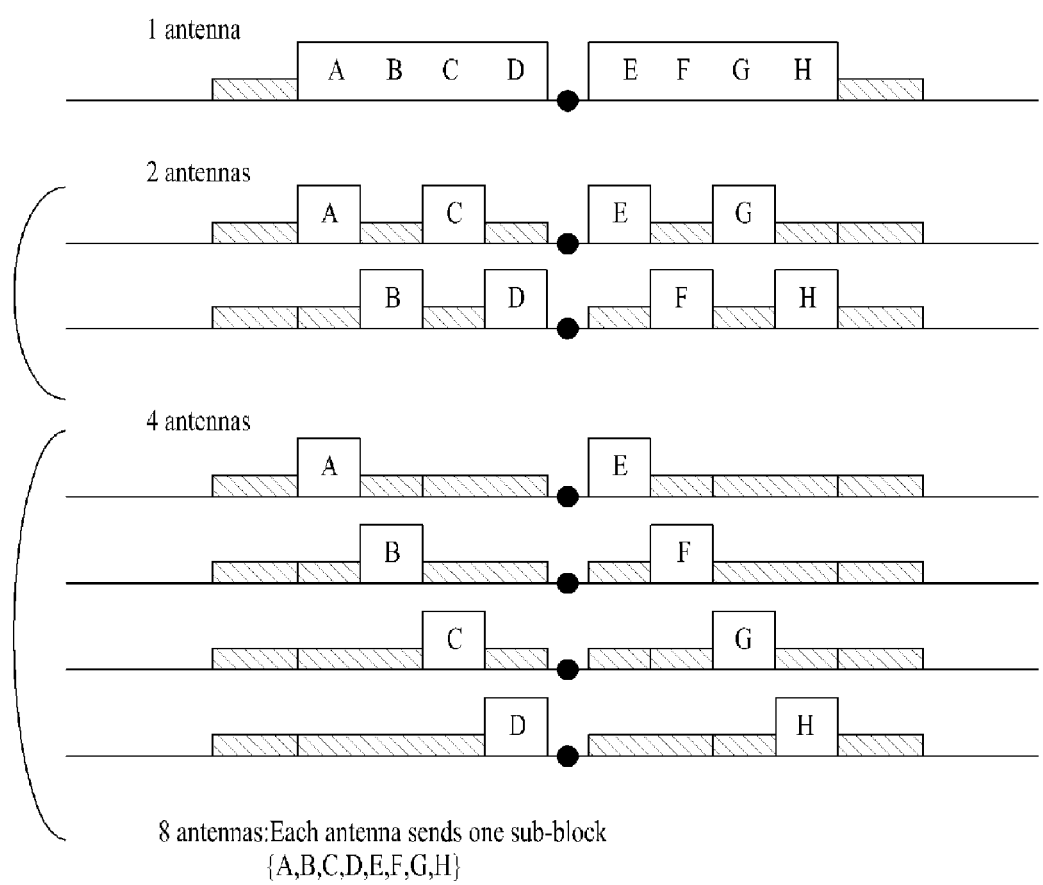
FIGS. 8 to 10 are diagrams of examples for an SA-preamble structure in MIMO antenna system.
Figure 9:
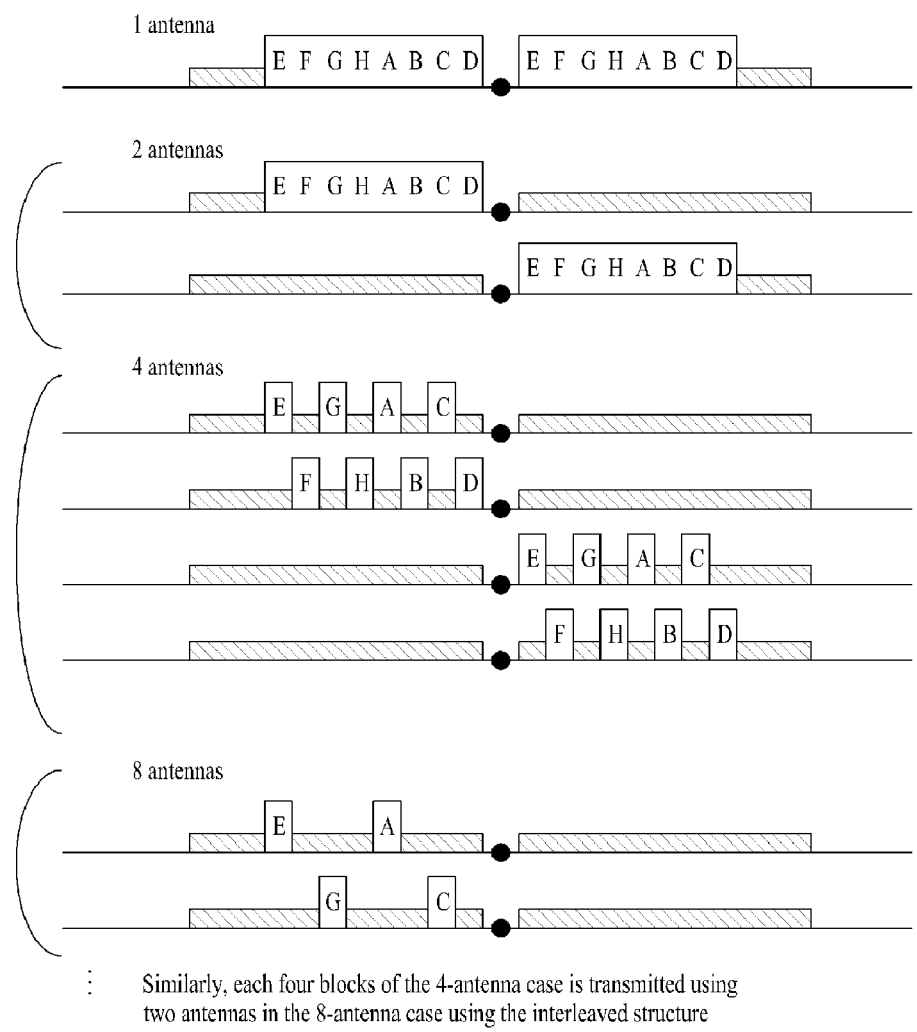
Figure 10:
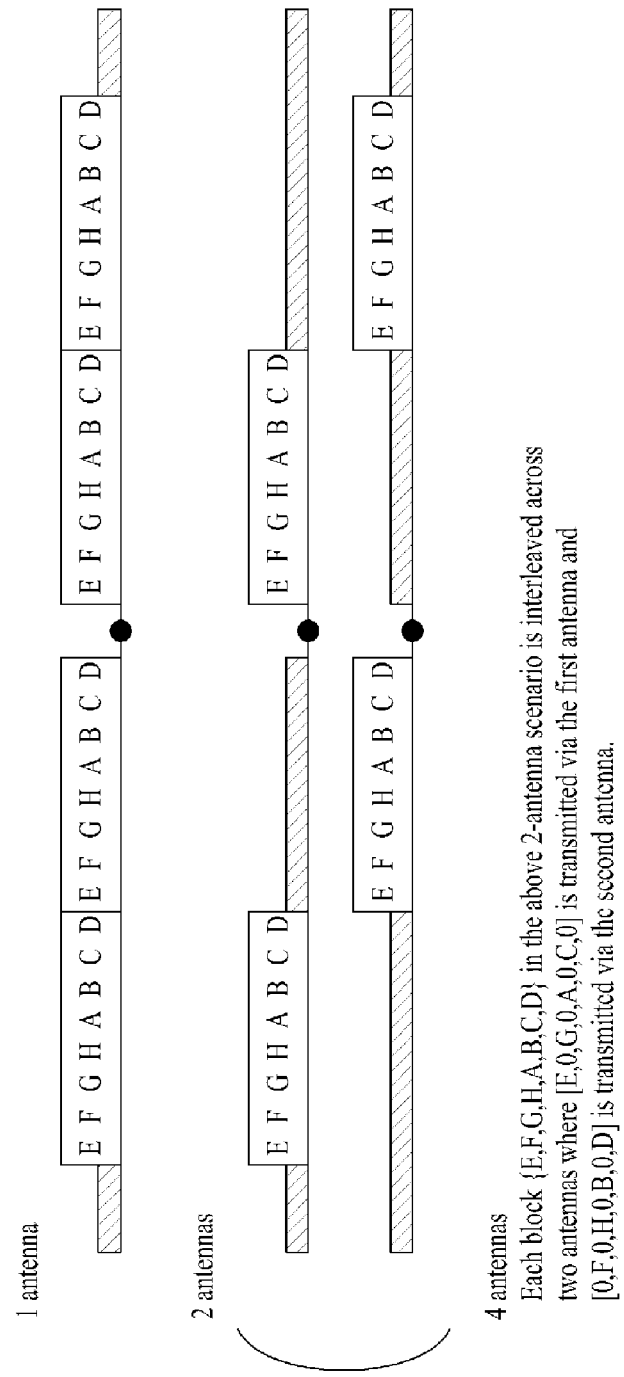

FIGS. 8 to 10 are diagrams of examples for an SA-preamble structure in MIMO antenna system; FIG. 8 shows an example for a case of 512-FFT. FIG. 9 shows an example for a case of 1024-FFT. And, FIG. 10 shows an example for a case of 2048-FFT.

Referring to FIGS. 8 to 10, an SA-preamble can be interleaved on a plurality of antennas. And, a method of interleaving an SA-preamble is non-limited. For instance, in case that an MIMO antenna system includes $2^n$ transmitting antennas, the SA-preamble can be interleaved by a scheme exemplarily shown in Table 3. For clarity and convenience, 8 contiguous subblocks {E, F, G, H, A, B, C, D} are named a block and symbols are defined as follows.

$N_t$: No. of transmitting antennas
$N_b$: Total No. of blocks
$N_s$: total No. of subblocks ($8 \times N_b$)
$N_{bt}$: No. of blocks per antenna ($N_b/N_t$)
$N_{st}$: No. of subblocks per antenna ($N_s/N_t$)

TABLE 3

If (Nbt ≥ 1)
Distribute contiguous blocks to $N_t$ antennas
Block is repeated in a given antenna by a period of $N_t$
Location of a block in $(t+1)^{th}$ antenna = $t + P \times N_t$
Where, t = 0, 1, 2, ..., $N_t$–1, p = 0, 1, 2, ..., $N_{bt}$ – 1
Else If ($N_{st}$ = 4)
Interleave subblocks {E, F, G, H, A, B, C, D} on 2
contiguous antennas
Allocate block [E, 0, G, 0, A, 0, C, 0] to an antenna i at
a block location floor (i/2)
Allocate block [0, F, 0, H, 0, B, 0, D] to an antenna i + 1 at a
block location floor ((i + 1)/2)
Where, i = 0, 2, 4, . . . , $N_t$
Else If ($N_{st}$ = 2)
Interleave subblocks {E, F, G, H, A, B, C, D} on 4
contiguous antennas
Allocate block [E, 0, 0, 0, A, 0, 0, 0] to an antenna i at
a block location floor (i/4)
Allocate block [0, 0, G, 0, 0, 0, C, 0] to an antenna i + 1
at a block location floor ((i + 1)/4)
Allocate block [0, F, 0, 0, 0, B, 0, 0] to an antenna i + 2
at a block location floor ((i + 2)/4)
Allocate block [0, 0, 0, H, 0, 0, 0, D] to an antenna i + 3
at a block location floor ((i + 3)/4)
Where, i = 0, 4, 8, . . . , $N_t$
Else
Interleave subblocks {E, F, G, H, A, B, C, D} on 8
contiguous antennas
Allocate block [E, 0, 0, 0, 0, 0, 0, 0] to an antenna i at
a block location floor (i/8)
Allocate block [0, F, 0, 0, 0, 0, 0, 0] to an antenna i + 1
at a block location floor ((i + 1)/8)
Allocate block [0, 0, G, 0, 0, 0, 0, 0] to an antenna i + 2
at a block location floor ((i + 2)/8)
Allocate block [0, 0, 0, H, 0, 0, 0, 0] to an antenna i + 3
at a block location floor ((i + 3)/8)
Allocate block [0, 0, 0, 0, A, 0, 0, 0] to an antenna i + 4
at a block location floor ((i + 4)/8)
Allocate block [0, 0, 0, 0, 0, B, 0, 0] to an antenna i + 5
at a block location floor ((i + 5)/8)
Allocate block [0, 0, 0, 0, 0, 0, C, 0] to an antenna i + 6
at a block location floor ((i + 6)/8)
Allocate block [0, 0, 0, 0, 0, 0, 0, D] to an antenna i + 7
at a block location floor ((i + 7)/8)
Where, i = 0, 8, . . . , $N_t$ A structure transmitted in each frame can be rotated within a transmitting antenna. For instance, considering 512-FFT system having 4 antennas, [A, 0, 0, 0, E, 0, 0, 0] is transmitted via a first antenna and [0, 0, 0, D, 0, 0, 0, H] can be transmitted via a fourth antenna, in $f^{th}$ frame. Afterwards, [0, 0, 0, D, 0, 0, 0, H] is transmitted via the first antenna and [A, 0, 0, 0, E, 0, 0, 0] can be transmitted via the fourth antenna, in $(f+1)^{th}$ frame.

Tables 4 to 6 exemplarily show 128 SA-preamble sequences. A mother sequence is indicated by an index q and is represented as hexadecimal format. Sequences of Tables 4 to 6 can correspond to segments 0 to 2, respectively. In Tables 4 to 6, the blk indicates a subblock constructing each sequence.

A modulated sequence can be obtained from transforming $X_i^{(q)}$ (X=A, B, C, D, E, F, G, H) into two QPSK symbols $v_{2i}^{(q)}$ and $v_{2i+1}^{(q)}$. In this case, the i indicates an integer ranging from 0 to 8 and the q indicates an integer ranging from 0 to 127. Formula 4 shows an example for transforming $X_i^{(q)}$ into 2 QPSK symbols.

$$v_{2i}^{(q)} = \exp\left(j\frac{\pi}{2}(2 \cdot b_{i,0}^{(q)} + b_{i,1}^{(q)})\right)$$

$$v_{2i+1}^{(q)} = \exp\left(j\frac{\pi}{2}(2 \cdot b_{i,2}^{(q)} + b_{i,3}^{(q)})\right)$$

[Formula 4]

In Formula 4, $X_i^{(q)} = 2^3 \cdot b_{i,0}^{(q)} + 2^2 \cdot b_{i,1}^{(q)} + 2^1 \cdot b_{i,2}^{(q)} + 2^0 \cdot b_{i,3}^{(q)}$. By Formula 4, binary numbers 00, 01, 10 and 11 are transformed into 1, j, −1 and −j, respectively. This is just exemplary. The $X_i^{(q)}$ can be transformed into QPSK symbols using a similar but different formula.

For example, if a sequence index q is 0, a sequence of a subblock A is 314C8648F. And, this sequence is modulated into QPSK signal of [+1 −j +1 +j +j +1 −j +1 −1 +1 +j −1 +j +1 −1 +1 −j −j].

Meanwhile, 128 sequences exemplarily shown in each of the tables can be extended twice using a complex conjugate operation. In particular, 128 sequences can be additionally generated by the complex conjugate operation and indexes 128 to 255 can be given to the generated sequences, respectively. In other words, an SA-preamble sequence of a sequence index x corresponding to one segment ID in a complex conjugate relation with an SA-preamble sequence of a sequence index x+128 corresponding to the one segment ID. Formula 5 represents a sequence extended from a mother sequence by the complex conjugate operation.

$$v_k^{(q)} = (v_k^{(q-128)})^* \text{ for } 128 \leq q < 255$$

[Formula 5]

In Formula 5, the k indicates an integer ranging from 0 to NSAP−1, the NSAP indicates a length of SA-preamble, a complex conjugate operation $(\cdot)^*$ changes a complex signal of (a+jb) into a complex signal of (a−jb) and also changes a complex signal of (a−jb) into a complex signal of (a+jb).

TABLE 4 n = 0: (Segment 0)

| q/blk | A | B | C | D | E | F | G | H |
|---|---|---|---|---|---|---|---|---|
| 0 | 314C8648F | 18BC23543 | 06361E654 | 27C552A2D | 3A7C69A77 | 011B29374 | 277D31A46 | 14B032757 |
| 1 | 281E84559 | 1A0CDDF7E | 2473A5D5B | 2C6439AB8 | 1CA9304C1 | 0AC3BECD0 | 34122C7F5 | 25362F596 |
| 2 | 00538AC77 | 38F9CBBC6 | 04DBCCB40 | 33CDC6E42 | 181114BE4 | 0766079FA | 2DD2F5450 | 13E0508B2 |
| 3 | 3BE4056D1 | 2C7953467 | 0E5F0DE66 | 03C9B2E7D | 1857FD2E3 | 15A276D4F | 210F282AF | 27CE61310 |
| 4 | 3DBAAE31E | 254AE8A85 | 168B63A64 | 05FDF74FB | 3948B6856 | 33656C528 | 1799C9BA1 | 004E0B673 |
| 5 | 177CE8FBC | 21CEE7F09 | 397CD6551 | 01D4A1A10 | 1730F9049 | 067D89EA9 | 3AC141077 | 3D7AD6888 |
| 6 | 3B78215A1 | 17F921D66 | 385006FDC | 011432C9D | 24ED16EA6 | 0A54922F1 | 02067E65D | 0FEC2128D |
| 7 | 01FF4E172 | 2A704C742 | 3A58705E1 | 3F3F66CD2 | 07CA4C462 | 1854C8AA3 | 03576092 | 06A989824 |
| 8 | 1A5B7278E | 1630D0D82 | 3001EF613 | 34CCF51A1 | 2120C250A | 06893FA2D | 156073692 | 07178CFA7 |
| 9 | 032E31906 | 2DD318EAA | 1DE55B14D | 0EF4B6FB3 | 27DED0610 | 1BC8440D3 | 0ED86BF8D | 14FAFDE2C |
| 10 | 174725FFD | 0D2FB1732 | 124470F56 | 292D9912B | 1571408A7 | 227197AE9 | 2430BC576 | 0B67304E0 |
| 11 | 1F1DCD669 | 293DD1701 | 0C34F1B84 | 28496EE51 | 3DC41327F | 071C06523 | 28E1657B6 | 02588EFDA |
| 12 | 22E4AA041 | 3810362F1 | 1955F1DE7 | 0D6D2F8BE | 11F31358E | 3EB27BB12 | 1F4E60111 | 119BDA927 |
| 13 | 14300B522 | 152E6D482 | 168DF6E43 | 0740B7AE0 | 14FE7DCDD | 0FA092626 | 23697615A | 1F1331EB8 |
| 14 | 12C65ED00 | 317643CD7 | 2C637A415 | 15E3E5185 | 0F5CBB9E0 | 23290B156 | 26F37EFE8 | 1AA174793 |
| 15 | 1DD6453F0 | 032C4BD39 | 082659BD5 | 320C5E691 | 224E555B2 | 3A9615A8D | 1BED03424 | 28E6A9CED |

TABLE 4-continued n = 0: (Segment 0)

| q/blk | A | B | C | D | E | F | G | H |
|---|---|---|---|---|---|---|---|---|
| 16 | 068AE7EE9 | 16F724910 | 3803DD9BD | 2A31A2FFB | 010BF5237 | 33CB067E6 | 0280C28B7 | 184417B94 |
| 17 | 1D651280A | 2C7BCF443 | 17324EFB0 | 236E5C411 | 381215183 | 2F076E64E | 0A6F2EE74 | 3DA4196B7 |
| 18 | 27341650F | 1B520099C | 09AC91114 | 000A5F48B | 30AB4B9B6 | 2D0DB0DE6 | 1CF57978A | 2D424406B |
| 19 | 3A01E2FB2 | 0DF5B257B | 019D1C63A | 0EA7DCDDB | 242D96605 | 2DA675F15 | 1DEC54193 | 3B6341C16 |
| 20 | 2DDFAEB05 | 21D0A1700 | 0FA09B78 | 17DA7F8BB | 06E883B3F | 02E6B929B | 2C1C413B4 | 030E46DD1 |
| 21 | 1B625E3F9 | 0F708F756 | 00CD97B18 | 3F036B4DF | 2CF08C3E5 | 213A5A681 | 14A298D91 | 3D2ED63BC |
| 22 | 2DA48D5A9 | 0C085BD17 | 01903428A | 3DF2A30D9 | 29061309A | 16F7DC40E | 2AF88A583 | 27C1DA5E9 |
| 23 | 30DBAC784 | 20C3B4C56 | 0F1538CB7 | 0DDE7E1BE | 2C312903B | 0FF21E6C2 | 032C15DE3 | 26C9A6BA4 |
| 24 | 3188E8100 | 385FEFE2D | 3967B56C7 | 3F62D246B | 1826A755E | 2CDA895EA | 2FAB77825 | 1B525FF88 |
| 25 | 339467175 | 2DE49506B | 27B7282A9 | 0254470A3 | 3374310AF | 2DF20FD64 | 3848A6806 | 11C183E49 |
| 26 | 02AFA38DC | 0F2AFDDF4 | 1A05650E2 | 061439F88 | 11C275BE0 | 30C41DEC9 | 119E070E9 | 1E76542C1 |
| 27 | 1B364E155 | 086FF808C | 29F1BA9DC | 0A830C788 | 2E70D0B3A | 34EA776B1 | 3D13615C0 | 15FC708D4 |
| 28 | 38ECFC198 | 07034E9B3 | 2340F86B3 | 07562464C | 22823E455 | 1F68D29E9 | 257BB66C6 | 1083992F1 |
| 29 | 375C4F5AB | 3C0F5A212 | 0EA21BC30 | 13E8A26F2 | 17C039773 | 283AD6662 | 1F63AB833 | 2DE933CAF |
| 30 | 2B773E3C5 | 3849BBE6C | 1CAD2E5AB | 0405FA1DE | 1B27B4269 | 3B3BF258F | 300E77286 | 39599C4B1 |
| 31 | 1E878F0BE | 0AE5267EC | 376F42154 | 1CD517CC2 | 302781C47 | 123FEC7E0 | 16664D3D8 | 24B871A55 |
| 32 | 20E200C0A | 1C94D2FF1 | 213F8F01B | 369A536E0 | 161588399 | 29389C7FC | 259855CAC | 06025DCE2 |
| 33 | 28D2E001C | 3C51C3727 | 106F37D0E | 1FB0EFDD1 | 2CD9D33C3 | 1EA190527 | 0BB5A6F9E | 074867D50 |
| 34 | 08EFC44B5 | 1B484EABE | 05FEB2DE2 | 211AF91B5 | 0CF52B1E1 | 002B5C978 | 11D6E5138 | 0D402BDD2 |
| 35 | 337C618F4 | 0A4C31DDA | 1D93003D6 | 006D7D088 | 348043A6D | 325E05758 | 2C53EEEB8 | 15ED8E614 |
| 36 | 38375C2FF | 18C78FD02 | 30C11EF53 | 3916581DD | 1B75263FF | 2D8DFD6A9 | 00C4E8482 | 1D201F96A |
| 37 | 2E10B0D05 | 2EF203893 | 2491D95F1 | 34D995B51 | 32214BDF5 | 3E45674B1 | 3E74AC66E | 1B813A999 |
| 38 | 153E7269D | 2391C7BFC | 1ADD3A595 | 0EFD3086E | 00AD88A8E | 0D8B007CA | 0F22C5F9D | 010E86385 |
| 39 | 3B58C7BFF | 0BA76496E | 3AD0B7BBF | 1D6D10FB3 | 3A607BEFC | 28F122A95 | 057950727 | 179449CB7 |
| 40 | 37AC5194A | 390DB9C00 | 3A48C0461 | 12FBCE4C6 | 2A8DD4171 | 10E9F1E34 | 251F5D167 | 1124E96B1 |
| 41 | 0FEF20C67 | 31EC9EA3F | 275B31143 | 22DA4F02B | 352C0F648 | 21FF5B9F3 | 3E5BC2372 | 0A1AE08FE |
| 42 | 080EDC49B | 17AD7F7BA | 390775B3C | 1380B00DA | 2477FF17C | 2E6D9E5AF | 05381F2DD | 26143CC17 |
| 43 | 2DB485795 | 1B3252799 | 39AD0211C | 3AAE31B76 | 30532A187 | 1C8EA5F5A | 2EA6E4D6B | 30570A2E4 |
| 44 | 11BB4F78A | 12CCE1428 | 2C67EEF99 | 20E3F841A | 20CFCD5F2 | 1618A7B94 | 111FF6092 | 2ED034E06 |
| 45 | 1C66335E5 | 0CA9B9BD2 | 3213028AE | 15542DD28 | 290F7DAE2 | 2137F02D5 | 17DF9445D | 24F162FFB |
| 46 | 360FB966B | 17D878955 | 1C1D67093 | 065B84F3A | 1A1D955E3 | 24C73C11E | 270EA9EB2 | 114DCA02C |
| 47 | 002CE84DD | 0616DD253 | 3EB188345 | 1FF852926 | 37E160F00 | 040DF51EC | 1857A33BA | 230FD8A0D |
| 48 | 233C0A71F | 22E428104 | 0325F8170 | 39566B188 | 32DA16A4A | 039FDF1DC | 27A3E946C | 0D69F26D9 |
| 49 | 0583F9F73 | 378380CB6 | 059D8A960 | 3E3442C7F | 026138ADB | 25F370F1E | 09D3EB2CC | 2D37D50C0 |
| 50 | 08DF9CC66 | 2C2E7AA8F | 3CB241ED2 | 03216B4D2 | 39736B451 | 25F6F113F | 08FD2AC3C | 1974574FD |
| 51 | 3D1FF6041 | 2CE2AB97F | 01A734F3B | 1DCF9F3C5 | 268D595CA | 1FBD2A8B8 | 0F1449F86 | 370C352FD |
| 52 | 123218E40 | 3AA057589 | 20F73A16F | 26E3BCA5F | 3A7330DC6 | 12C659384 | 3D99FF1B | 276DFC540 |
| 53 | 185AEDEA4 | 0418B3643 | 382F7700A | 3FC35ED60 | 07BA2F838 | 1BC840C93 | 2469A41EC | 0CE7B4CB0 |
| 54 | 2E194E2BF | 3302A0B28 | 1836001EE | 154A4738A | 36A3BBD72 | 23CCD0EB1 | 044B3A13B | 2B50C8057 |
| 55 | 0B76405D3 | 231AAA728 | 0EE05E9B6 | 0093A21F2 | 2065A01D0 | 1F2B810D4 | 1082F3A73 | 1DAFEA492 |
| 56 | 07AD23A3A | 2091957F1 | 3B9D8CBF0 | 21E4160BE | 1BFB25224 | 3D9085D16 | 03076DD39 | 1DBCF8D03 |
| 57 | 226D70EBF | 3ED15246C | 364130C46 | 22F6D4AA3 | 3FCC9A71B | 3B9283111 | 0484F0E58 | 14574BD47 |
| 58 | 3F49B0987 | 305231FA6 | 0CF4F6788 | 3B9296AED | 2346190C5 | 3365711F4 | 078900D4A | 352686E95 |
| 59 | 1D62AC9A4 | 104EDD1F5 | 1B0E77300 | 1CED8E7F0 | 388E8002C | 1FE6199F4 | 02239CB15 | 1FE5D49A2 |
| 60 | 21314C269 | 28600D12A | 22E4F1BAA | 044E211B1 | 0DECFE1B4 | 3E5B208CC | 1CFC91293 | 21E7A906B |
| 61 | 02C029E33 | 1BA88BE4D | 3742AE82F | 21EF0810F | 17D23F465 | 240446FB5 | 17CCE51D9 | 2C0B0E252 |
| 62 | 16F902976 | 10185ECE6 | 2821673FD | 02674271C | 3A8A75B7C | 226D4BF0F | 2216004E5 | 0E8605674 |
| 63 | 06E4CB337 | 32A31755D | 062BE7F99 | 1417A922D | 2271C07E5 | 24D6111FA | 3F2639C75 | 0CE2BB3A0 |
| 64 | 18D139446 | 2426B2EA8 | 352F18410 | 1133C535E | 10CC1A28F | 1A8B54749 | 22A54A6F4 | 2F1920F40 |
| 65 | 22443017A | 2265A18F5 | 14E1DAE70 | 11AC6EA79 | 31A740502 | 3B14311E | 3AA31686D | 26A3A961C |
| 66 | 2018F4CA9 | 3A0129A26 | 39BDA332E | 1941B7B49 | 03BBCE0D8 | 20E65BD62 | 2E4A6EE6C | 3B095CCB3 |
| 67 | 0CC97E07D | 11371E5FF | 31DFF2F50 | 17D46E889 | 352B75BEA | 1F1529893 | 21E6F4950 | 1BD034D98 |
| 68 | 275B00B72 | 125F0FE20 | 0FB6DE016 | 0C2E8C780 | 3026E5719 | 119910F5F | 3B647515B | 1D49FED6F |
| 69 | 250616E04 | 0882F53BF | 11518A028 | 3E9C4149D | 09F72A7FB | 0CC6F4F74 | 2838C3FD1 | 08E87689B |
| 70 | 212957CC2 | 03DD3475B | 044836A0B | 2463B52C0 | 0342FB4B0 | 34AD95E9B | 2936E2045 | 3B0592D99 |
| 71 | 2922BD856 | 22E06C30C | 390070AED | 09D6DC54F | 3485FA515 | 064D60376 | 07E8288B3 | 3DD3141BF |
| 72 | 29CB07995 | 007EE4B8B | 16E787603 | 07C219E93 | 1031B93DD | 23DEFF60B | 30F1D7F67 | 0EFE02882 |
| 73 | 11F3A0A2F | 38C5894A7 | 3FE72D35B | 1F655E0D1 | 0B3AC0D92 | 3430DDB1A | 3BAADBF42 | 02D6124C0 |
| 74 | 05FC8085D | 345A5C470 | 07DAAE1E9 | 0D7150B88 | 25D2A5B10 | 16F8E5021 | 3240EFC71 | 0F0F5922D |
| 75 | 399F32F6E | 2EEB17A8E | 0D61665D0 | 2138EE96F | 3F8119063 | 01B5048F7 | 27075153D | 265DF8280 |
| 76 | 3962CC581 | 2337D2983 | 286FD7BBA | 185126E0E | 1F95AD927 | 0F7EBC374 | 1E3A4B6FF | 20CA9B9BD |
| 77 | 1C85C13AF | 290C37167 | 1FDD26E8F | 0C38736B8 | 0174DB972 | 0A921E3CC | 097557C9D | 09452C1E6 |
| 78 | 2D48D6C00 | 2D9BC8DFE | 10FF1E128 | 25C96BA85 | 0FB071B8E | 0F09B3C9C | 1A3E11441 | 38EDDA03D |
| 79 | 396B88B2F | 0029F4BDB | 30D098CAD | 0D54D12CB | 1D0823F55 | 2DC53B9AA | 11BCF7438 | 33F6EC091 |
| 80 | 21E03CD65 | 1A2FE5B92 | 2851F8445 | 0251E386C | 1468950D8 | 1A8B39748 | 001B42236 | 26CD82DA5 |
| 81 | 2CEA1E6BB | 006C97E74 | 00C2B887D | 23461AF95 | 0E9CB2BD2 | 0B0EA3022 | 1FB56A7A3 | 25A7FA625 |
| 82 | 208FC2A1F | 381C5733A | 03F11D7E3 | 07ED6A7B7 | 1FEC8E509 | 3D61E0440 | 356FA81C3 | 3756E5042 |
| 83 | 2061E47F0 | 22AA0AD3 | 24796BB65 | 03C59B4D8 | 32A75E105 | 22155381B | 23E5F041C | 155D2D7F9 |
| 84 | 381AFFB73 | 212B5E400 | 1F1FE108E | 04BF2C90D | 3C1A949D9 | 2854A9B45 | 001B09322 | 3A9372CC1 |
| 85 | 058B23433 | 0904C6684 | 158CADB9E | 11BA4B978 | 1854368F4 | 1919ECEA7 | 147F1FD34 | 2E228AA3C |
| 86 | 34857F3DB | 2CB44F7BF | 111A065D3 | 2BEAB392E | 27F081ED8 | 3E67D1186 | 0F6265AC5 | 27716FAF9 |
| 87 | 38EBB8BF1 | 32ED6E78F | 2B0BA4966 | 2188282AA | 00D49B758 | 1765BA752 | 2B50AFDCC | 068C82450 |
| 88 | 234F0B406 | 02FB239CD | 15AD61139 | 2250A5A05 | 1CD8117E0 | 0D849163F | 268C7A5A6 | 22A802020 |
| 89 | 2D0FE8D16 | 0C14E3771 | 07DE5320C | 0640C2762 | 1CBD9FF4E | 37A91986D | 2024DA401 | 164D4A84C |
| 90 | 3225B4D60 | 3013B75F2 | 2A77AE5C5 | 2C25377EE | 03C8DF835 | 346E80FCB | 116B79FA5 | 356D2B604 |
| 91 | 0D55231FD | 247907E31 | 0CFA0B049 | 36D069A95 | 10D4CDE71 | 1A32544D7 | 38336885F | 173ECC08D |

TABLE 4-continued n = 0: (Segment 0)

| q/blk | A | B | C | D | E | F | G | H |
|---|---|---|---|---|---|---|---|---|
| 92 | 207420EAC | 26FCFE182 | 3FE7B31C6 | 15B320E13 | 187AA34A8 | 1B52253BF | 1FA16669D | 3725A81A5 |
| 93 | 3C9C7404A | 092B77FEB | 3B9865B46 | 349456F61 | 39B7C6A66 | 3075EC990 | 01BE637DF | 330897B17 |
| 94 | 1CA4C048D | 284D50621 | 2BF917627 | 3EA2CC5E1 | 33EC0A1E3 | 05FE0F747 | 349553D72 | 396077301 |
| 95 | 04CEC1C82 | 1F828DD00 | 30122C790 | 1AD8A7895 | 1CE0912C0 | 298382F37 | 2D4D33F06 | 001364B36 |
| 96 | 37F8BB035 | 2F0897994 | 333F5F096 | 0F28AB363 | 20036829F | 338017E2D | 3A5A05D76 | 0CC02E5E0 |
| 97 | 02FD351E6 | 03E316288 | 2FCAEB4F8 | 1C5A80CE3 | 3D3AC3FDD | 3E456746D | 119A5381F | 1581C894E |
| 98 | 1623B3D0F | 103224D80 | 0FB936BC8 | 2EED7F082 | 26C91513A | 2F12E4C31 | 290F3AEF2 | 392CBFF67 |
| 99 | 02F75DE8F | 2E61A834D | 02A692866 | 1F21044A3 | 2D7881A95 | 18651EE05 | 11FE3D308 | 39EED56DA |
| 100 | 3A858659E | 2F7A87BE0 | 135FD561D | 27B3B651A | 05E131CB9 | 0D5865123 | 2CD6991E5 | 3EE6DF705 |
| 101 | 3F3B247E1 | 32D02B245 | 16B98A593 | 1E4CCFF18 | 0C4A9D285 | 06D519FE2 | 023A336CD | 1B20E999E |
| 102 | 3A9E8B49B | 239656AD1 | 3396D1C51 | 06F4DCF40 | 15D819D3F | 2A3061144 | 20BD2A33E | 2FFB139CD |
| 103 | 38622F3AF | 24BF9BB7F | 1D2729010 | 15877B93A | 00376B0E7 | 0FF064887 | 3505CFD9B | 354C366B6 |
| 104 | 2A0AB7033 | 1AFA65DE1 | 1198D0AD6 | 38E80C86A | 27693D541 | 3BB26F3D4 | 39154881C | 0E7DD6D6B |
| 105 | 1B0DE4333 | 27FE0F6D1 | 0F00B2888 | 0BDA322FF | 2759B5A4F | 0543A2D27 | 0C36DD1E5 | 04E9A262D |
| 106 | 1C7E636BF | 000E9C271 | 2B44F4F30 | 28255BF77 | 1CC4D69CE | 03F4C57B2 | 3E926D59B | 00AA39BDB |
| 107 | 1FDE98AE0 | 0CD076B07 | 171124FB5 | 33F098288 | 1E0B3043E | 39731D117 | 3E7ABC2C8 | 19CC50279 |
| 108 | 28EE855ED | 2A704C371 | 03288F4B0 | 3C83E26C2 | 0A905148B | 18C66BB94 | 1BCC32537 | 10D71AB44 |
| 109 | 26238A065 | 0FBD7BCDD | 02507CF76 | 059F69484 | 3FE0D6F77 | 2466A50DB | 3C07A75B2 | 2DC0F099E |
| 110 | 3CDCD6CBE | 1446783DA | 1626C83F9 | 2FD4C4DF3 | 13A59A2D1 | 2C903D2A3 | 0FD37F076 | 0B1039EDD |
| 111 | 043B07DD7 | 28D9C2155 | 2CCEF57A8 | 34254C1B7 | 09B933B2F | 1FA410127 | 10BD5E9E6 | 010EC6389 |
| 112 | 345E8FCAC | 226BD7FEA | 27341A51C | 23854F031 | 04C297212 | 044DED8E8 | 319B3BFB8 | 37DBBBF57 |
| 113 | 16FBEFA72 | 1B5EF9484 | 2DEE7A5BF | 097695C12 | 08AEAD5E8 | 3DA7C1327 | 2B81F3E2D | 31AFBED32 |
| 114 | 3484086B1 | 2DFA56B9E | 226E8AFE5 | 285F45484 | 3E69AC8E1 | 1CB33645F | 2DE53BC30 | 2F6ED567E |
| 115 | 1117B5E7D | 122A4D471 | 1AC936544 | 267010D71 | 10428CA47 | 24B72A000 | 2E27FE185 | 1E62C1403 |
| 116 | 0B3161E37 | 038C3DC98 | 100793647 | 1A95D8D36 | 399668787 | 06C0D4922 | 25F48AA58 | 2DFFF1789 |
| 117 | 04FEF7231 | 381910B63 | 298783078 | 30CE5EC1C | 29F6F299D | 3C34CA770 | 37BAAB139 | 3D2069B65 |
| 118 | 18F644052 | 2051880EC | 23ADBF949 | 04237280A | 18304E663 | 287364EFF | 314698D78 | 149A21E51 |
| 119 | 39E14BBCB | 1DBDA9EF4 | 3ECCAD8D3 | 1BA3EF99D | 26D85CEBF | 270547292 | 0FB3C7826 | 0131E73D6 |
| 120 | 2DD6F3F93 | 0FC282088 | 14A143DDD | 0AB840813 | 0B973037C | 29535C9AB | 0DF8DA2AC | 271CBC095 |
| 121 | 1C1D063F9 | 3F4EF6DCC | 00128D932 | 145E31F97 | 0B21590D1 | 38F1602D8 | 3AC2EBB74 | 2320957C5 |
| 122 | 3383C846F | 12128F29B | 19985CE7D | 2834CBBF2 | 1E1513B3D | 364DB5800 | 33EE3F46C | 01A865277 |
| 123 | 0129D260B | 238A85BA0 | 2D81AA924 | 3917048B6 | 36F857692 | 1D2F813C3 | 0505FB48B | 3DC438BC5 |
| 124 | 05E0F8BDC | 3D978C1F1 | 266F83FCA | 0E89D715A | 01821DEA4 | 12D9AE517 | 22F8EAC2C | 3C098DA58 |
| 125 | 1575D1CE9 | 26F291851 | 3A7BB6D2C | 12CC21A3A | 2975589B0 | 39CF607FF | 388ABF183 | 3D3BAAB0B |
| 126 | 101E5EC7A | 0B75BCF3B | 13ED25A86 | 35FC032B6 | 2F6209FF0 | 13C7B2041 | 1F2791466 | 3A759A6C2 |
| 127 | 1EF89091A | 11A653D2C | 223FC1F42 | 2F7B97B31 | 2CA4EE011 | 00F68767D | 10FE34682 | 018339212 |

TABLE 5 n = 1 (Segment 1):

| q/blk | A | B | C | D | E | F | G | H |
|---|---|---|---|---|---|---|---|---|
| 0 | 20A601017 | 10D0A84DE | 0A8C74995 | 07B9C4C42 | 23DB99BF9 | 12114A3F5 | 25341EDB0 | 362D37C00 |
| 1 | 1364F32EC | 0C4648173 | 08C12DA0C | 19BD8D33A | 3F5F0DDA6 | 24F99C596 | 026976120 | 3B40418C7 |
| 2 | 1C6548078 | 0A0D98F3C | 0AC496588 | 38CBF2572 | 22D7DA300 | 1CCEAF135 | 356CA0CCF | 093983370 |
| 3 | 03A8E3621 | 2D2042AF5 | 2AB5CC93B | 05A0B2E2E | 0B603C09E | 117AC5C94 | 2D9DEA5A0 | 0BDFF0D89 |
| 4 | 07C4F8A63 | 3E6F78118 | 32CCD25F2 | 1792A7B61 | 0A8659788 | 1F9708C04 | 086AF6E64 | 040B9CD78 |
| 5 | 2D7EE485A | 2C3347A25 | 3B98E86AF | 242706DC3 | 1CEF639AF | 2E1B0D6A9 | 3E9F78BC1 | 0FB31275F |
| 6 | 0307936D0 | 21CE15F03 | 392655B2D | 17BE2DE53 | 3718F9AB8 | 01A986D24 | 077BDA4EB | 1D670A3A6 |
| 7 | 05A10F7B7 | 31900ACE0 | 28DCA8010 | 2D927ABE5 | 370B33E05 | 31E57BCBE | 030DC5FE1 | 093FDB77B |
| 8 | 092C4FED1 | 268BF6E42 | 24576811F | 09F2DAA7F | 24EFFC8B1 | 21C205A90 | 1E7A58A84 | 048C453EB |
| 9 | 29F162A99 | 1F739A8BF | 09F684599 | 1BEC37264 | 38ED51986 | 286325300 | 344FC460A | 3907B1161 |
| 10 | 0E4616304 | 0FABDCD08 | 0F6D6BE23 | 1B0E7FEDD | 0047DE6C2 | 36742C0C6 | 2D7ABB967 | 10D5481DF |
| 11 | 32DD51790 | 237D6ACFA | 2F691197A | 16724EA58 | 149143636 | 3810C6EE1 | 3A78B3FC6 | 1B1259333 |
| 12 | 1BB0FD4D3 | 235F10A55 | 1C7302A27 | 1148B18E5 | 04F25FBC8 | 2A0A8830C | 3646DBE59 | 2F25F8C30 |
| 13 | 0FB38C45B | 069DF29E9 | 00F93771B | 3AA35746D | 2CAF48FD0 | 0A42CDD55 | 19A23CE8F | 26318A30F |
| 14 | 365FBEDAC | 27710945F | 2AA367D61 | 05A484318 | 2563F27D9 | 2D37D5C00 | 287D18FBB | 3ADB44805 |
| 15 | 3038BC77D | 2A45D29EC | 156173792 | 03EC7679E | 07577E1A4 | 1B6A94A74 | 1D26E5A94 | 0FD878D5A |
| 16 | 1F22158E4 | 3F02A1D37 | 2767EC03F | 1C8CD535A | 23DA2E5AB | 2D5F25A59 | 0971AA889 | 3E78C1846 |
| 17 | 16521E709 | 12C2DB8FE | 3A596C221 | 1562D5C27 | 1D9E1F39A | 345B96872 | 301C7894E | 2797F032D |
| 18 | 2EC951A24 | 1ED768F3F | 11217930A | 39DB44855 | 36E41B3FC | 0F6E48C44 | 36254C517 | 14493C673 |
| 19 | 3EA159E72 | 24ADE96FE | 3458C73A6 | 30674E1FB | 242109AF2 | 24DAF32B6 | 24B1EDFFE | 291CB9D15 |
| 20 | 2AD0E6696 | 04F4077D9 | 1BB279A53 | 38957605B | 379B7A6A0 | 0BAD35616 | 1285EAE51 | 37425C7FF |
| 21 | 083637980 | 34F2ED66F | 282846A88 | 19D5E40A6 | 21205942C | 27AC551E9 | 0F3F4C262 | 0505FB522 |
| 22 | 3E7D64856 | 1DB0E599E | 159120A4B | 1FC788139 | 235C454FB | 3CE5B67C8 | 339EADB32 | 0F9F7DDC1 |
| 23 | 3956371B8 | 1D67BE6E5 | 1EFCF7D53 | 041A5C363 | 2E281EB3F | 00AF8A1ED | 2DE24A56F | 1332C0793 |
| 24 | 0818C47A9 | 1F945634B | 1C5ED3403 | 1043B5BF4 | 149702D22 | 024CBB687 | 34B01FA8B | 1E9F5992F |
| 25 | 3A6618167 | 3A0007886 | 3EDB5756B | 2F2FA6FCD | 21A5252B8 | 396FFAD9D | 05347B60C | 2E0ECA200 |
| 26 | 0D45F89A1 | 3F9C2C26E | 1CBCF809E | 3CBE5FCD0 | 3D2DCF245 | 14F351A1E | 224F5B3FF | 2AA6ED34B |
| 27 | 3BA85ADF8 | 282005732 | 3AD7C0223 | 2E73D1800 | 23DEA3F46 | 2275280F6 | 1586270F9 | 0CEF4287B |
| 28 | 07DFE662E | 314B74F2F | 397BDDC4C | 223A8071F | 1F5BE3BB4 | 093BB1F33 | 0FCA2D129 | 21B3526A9 |
| 29 | 39FEADC12 | 0ECE1CD67 | 206228FAA | 38FCCA606 | 0C5EEE08F | 1C1BBDD4E | 1459E42ED | 11FD64ADF |

TABLE 5-continued n = 1 (Segment 1):

| q/blk | A | B | C | D | E | F | G | H |
|---|---|---|---|---|---|---|---|---|
| 30 | 2735FFB20 | 2AE9B244A | 1A5AED974 | 38FCFD5CB | 20310DB81 | 1C5FC3E24 | 19FB3BA17 | 3785BE865 |
| 31 | 24FF6B7EC | 01C682673 | 19CB14113 | 2C8CD3C2A | 066725853 | 02CD0A23B | 279B54315 | 0CD571063 |
| 32 | 015E28584 | 30B497250 | 127E9B2E1 | 2C675E959 | 05F442DEE | 394AEF6E2 | 079E5C840 | 12703D619 |
| 33 | 3CE4B1266 | 35270B10F | 03549C4B3 | 3B3E6C375 | 1DBEF270E | 0042C9737 | 049522EC6 | 24961653E |
| 34 | 34176CD90 | 2B5E9EAE1 | 1C95E3C2B | 1EF541D4D | 26D1450E6 | 3B9D895AB | 1B0C84349 | 104B6B428 |
| 35 | 07A813421 | 2B39EAADC | 33553571C | 0F8046CDF | 2CF6A7F23 | 0AE3BE8C8 | 308BFF531 | 2DBC0F9E3 |
| 36 | 168276972 | 2CF41744F | 3CF2512E0 | 0F8B68ABC | 2E609F6AF | 04E03AC8C | 0F9B66F49 | 3AFE28736 |
| 37 | 03456021F | 1982574F3 | 0BB2B3F49 | 15A4A1CDE | 15487D58E | 2907C9ABB | 15C0D2D73 | 28D8CFEC3 |
| 38 | 3D3FD677C | 33AF2628F | 3D217FDCF | 249BD8A94 | 0A463F23B | 2F2AE8324 | 1D1E945E0 | 2EB355D28 |
| 39 | 3BCAF9076 | 3A7D2FF70 | 3C541F38B | 249BD8A94 | 287BC4833 | 141391EB7 | 05B6443D0 | 2FEACC5E7 |
| 40 | 275F118FA | 3A96B346D | 0C713CDE5 | 02F394A28 | 3EBB1D18D | 1BE7A9FDD | 223C53CA1 | 2BF040F77 |
| 41 | 1161DE4F5 | 0544F9DB7 | 230847E45 | 322AF4E17 | 26944A0B4 | 3299F1420 | 1C9405B8E | 2DBABD4CE |
| 42 | 33165C531 | 268FE9B9B | 081A914B4 | 39100772B | 27DBF03E9 | 3E3A18AB0 | 13F2D2B83 | 2CEEE5FF4 |
| 43 | 275F97006 | 0A578F2EF | 16CEE7EC8 | 38A5B0084 | 00DC9A1F5 | 1B88CFA3D | 0D8B0B8EF | 29FC4CCF2 |
| 44 | 04BBE4F2C | 1546C3988 | 237105A43 | 339042B36 | 3A5DEBE2B | 1BD09449D | 38EFF588B | 1CDD3A6C0 |
| 45 | 002E32D38 | 1E85D3125 | 3F51120D7 | 00420ED63 | 3384713AF | 1D941BD34 | 2B39EA9CF | 05B6D9E94 |
| 46 | 2B3100F7B | 335EDB2E6 | 1AC8C8EE4 | 337FF7139 | 0672D7995 | 38A54856E | 0124753F2 | 3A3560851 |
| 47 | 046207CE9 | 0FE1BC312 | 09BA5B289 | 39376EF2B | 33F826C2C | 2F6531496 | 3933B8616 | 23125B50F |
| 48 | 3E5849C45 | 01EEDB390 | 141D9A024 | 2DE07E565 | 1813D12BB | 36DB8D404 | 0E8A272AB | 3A66B71AD |
| 49 | 1A2A88A4C | 3F0C9B4DB | 266CFBDF9 | 163420CA5 | 281ABBE99 | 34771C295 | 3AC051848 | 3C53CB875 |
| 50 | 16F795184 | 3466F1FFA | 1F433B456 | 1DDF13810 | 25F58CF69 | 1DD6CFE4E | 10A236FDF | 12AE697ED |
| 51 | 1C8D17F4F | 07C43B7D1 | 1C8DAD395 | 28F6C112E | 3A336ADB3 | 0EB6889AB | 2783A6A1F | 2CDA40458 |
| 52 | 16044624E | 252AA04B2 | 11484E85C | 07F5024B7 | 286E3A67F | 2EE6BACE4 | 277F1F864 | 22F3CF57D |
| 53 | 2D1A3F4CF | 0EEB6DEC1 | 30CD76F42 | 20403D1AC | 3A72EF9D6 | 1DAAF2A39 | 03AB76CE0 | 0A2856267 |
| 54 | 0FA2A786B | 38273EDF2 | 0309DF52D | 0BBDAEDC | 093BDAEDC | 1B11E9300 | 1DA9C5324 | 03365EB1E |
| 55 | 24DCFDC06 | 11CF909D6 | 2FF693F4C | 366338F1F | 22E641569 | 0ACA60D55 | 32D1B009E | 035472E09 |
| 56 | 17F5D6662 | 062CFC913 | 35B211035 | 21ACE73FB | 3B4148706 | 2D0CD106F | 2CAB457A4 | 103E1E49B |
| 57 | 21859E8DA | 2F1E3B3D9 | 1F1014BE2 | 062A3DEB5 | 354C00786 | 05A8982D4 | 35A758943 | 346EBA72A |
| 58 | 00CB49E5F | 211B1034A | 3A5D2DAF1 | 21D3F3EB0 | 24B2D1150 | 1097C3685 | 2AA3671CE | 0E5DC1308 |
| 59 | 24C8401BE | 217B1F994 | 1FB9664A8 | 3D5057708 | 05A506088 | 1314842B9 | 3C8657064 | 14B1FA77F |
| 60 | 2AD698E2E | 3C129D1F6 | 2C744FF4E | 1C1C052F8 | 18C38A9FE | 252168A10 | 2EB68D098 | 3A001CBD2 |
| 61 | 2AF71324C | 2BF41D408 | 0FC498E18 | 149A1A407 | 0FDC2C4A3 | 19D00C4A1 | 0F6B0DD29 | 268CF8E86 |
| 62 | 19F4D82A5 | 342C73FD5 | 0F5AEEDE7 | 21A2A8953 | 15ADB7A94 | 11DBE038D | 0A5B6634A | 0FA382B77 |
| 63 | 0A5985778 | 35AC3032D | 35691C85D | 2829D55EE | 04A3FBD8C | 2C85BFA8E | 0F459B864 | 3E878F0BC |
| 64 | 10C785EB0 | 054D4CE18 | 1BF657A8E | 101DC64EF | 0B4E3032A | 24ECFD9C2 | 00C98BE0A | 2A1F82444 |
| 65 | 300E8B09C | 31A079FB3 | 0C41DEC5F | 216CCFE4D | 226C5A693 | 3C31A41DD | 3A019974C | 23B64EAFC |
| 66 | 249BDC80F | 0316ED79E | 1E42B5567 | 0CFF04A4B | 310678543 | 34D986980 | 1E3195429 | 280966E65 |
| 67 | 359A72B64 | 186A3999D | 065825DDF | 2D28E6000 | 10964C1E1 | 1468C970E | 34C8B606A | 33CC94DB1 |
| 68 | 370B29C05 | 12841A9E8 | 2147E7160 | 1835345EE | 06DB43F37 | 33854A725 | 065E6614C | 151E2D7B1 |
| 69 | 0EAADDB27 | 004EC6DDD | 30AA39B8B | 2AEB34AD4 | 2A13D6649 | 00EC67B83 | 1176417CE | 0E3683151 |
| 70 | 0832BA87B | 3B67515B9 | 0FD34BC87 | 1688F83CB | 370B52AD5 | 3A2CD6F3F | 3343BF461 | 37BD48546 |
| 71 | 16EA2751C | 1799D9C42 | 24055CEC9 | 226A907D4 | 133C68F80 | 22CA03BF0 | 05F723395 | 2D35008AF |
| 72 | 122A5C67D | 3E46230BC | 09F475BA9 | 15B4B6754 | 11DE75C50 | 28C17544F | 1D85FAB8D | 0D5AD9537 |
| 73 | 1C5497CD9 | 3D405F487 | 05535D737 | 06952087B | 1C4744AF4 | 3E0EF881C | 3CED3D1BB | 1D91157CE |
| 74 | 1D276153D | 14604EA77 | 1661FB979 | 3BAC5E9FB | 089F41406 | 283154122 | 2AFDCE892 | 1FD5E0810 |
| 75 | 2A620F4C2 | 0DE484180 | 2D05E6458 | 3E6D15A27 | 0A92FF0B7 | 2CBF7BF53 | 25A2F28FA | 19A10CE02 |
| 76 | 3A77B1FBE | 2B262F810 | 2BEEA0F46 | 39706BBA2 | 09257163F | 1026D5D74 | 2E2483EBF | 1D6527C1E |
| 77 | 0DC1EBA02 | 383C59C77 | 28C7ED115 | 06FED31D4 | 16F610DC3 | 000890B82 | 2FAD16A3A | 35C9AD95F |
| 78 | 3E5C1EBE2 | 3C65A7691 | 2394005B6 | 251B1BB49 | 1F42BFA23 | 0E8608C07 | 24666F55C | 11A5214DF |
| 79 | 323E882C5 | 2DBFF5E13 | 3638BC43F | 38CC5CBB5 | 1DBF783FB | 0499418C7 | 2285E5A40 | 1A61D17E7 |
| 80 | 1E508F19D | 0CF345F97 | 0E5648601 | 0A0951DF3 | 1194EE717 | 0A6C0B374 | 03C4E19EC | 06F725799 |
| 81 | 0B54F4AEF | 186A12343 | 04C4A60C6 | 27C2CC0E9 | 3973075A1 | 392C5EEB7 | 3933C99B1 | 005F98CB2 |
| 82 | 021B6635A | 3764D0696 | 20942B266 | 0155C4EDD | 3FDBF7497 | 37356D442 | 374F3DB06 | 2718357FE |
| 83 | 120DF6F80 | 3C10BD1A0 | 03544C7B2 | 2D6795EFD | 29E8811F1 | 1B3EFD388 | 01CA4C48D | 2067E8033 |
| 84 | 07703D649 | 35221AB50 | 22141A0D7 | 268061A59 | 2D9192B05 | 3834711FF | 3A07258C0 | 36253B5AA |
| 85 | 1C4A564C1 | 26804247A | 16A4DB29D | 0BEF93C88 | 37A3EAB6C | 25547B136 | 3FC935878 | 250E3BF1C |
| 86 | 17049BB43 | 0D6426761 | 2BF3A471E | 1665820E9 | 14412A13D | 30D5744B0 | 2ECE5CAE6 | 01395189C |
| 87 | 29615B890 | 0A2C5A664 | 216DA64F4 | 3D4AA9D2C | 07B98342C | 2603F0D76 | 0574BDFA8 | 3F9B35D5D |
| 88 | 3A0414B22 | 0A8BE885E | 155C220E4 | 2D3B17AA6 | 3017E1B48 | 26508C6C8 | 3FF25EC63 | 240EFF072 |
| 89 | 2ACD81CE3 | 0468D7943 | 2A4108121 | 1F2E8E67F | 3AB446179 | 33325CA24 | 3006DD3A5 | 1A33F3A2C |
| 90 | 2B038BAF7 | 070660C4E | 30953C7B7 | 3E7375D04 | 1D6A39944 | 001BE5C8D | 199A89253 | 0A82087BB |
| 91 | 03BF7C836 | 2CBF9FC48 | 38EAB1C98 | 11C303993 | 3D748807F | 1EBD41D17 | 351085EF2 | 1C55B94D3 |
| 92 | 116E0BE61 | 2DC18EAA2 | 31BD1EAA2 | 1CF87C049 | 2A41CC04D | 3883EFEC1 | 3971BBBE2 | 190CAE3B7 |
| 93 | 172799BB5 | 3301DB193 | 2480B569B | 34DBEFE9C | 003287827 | 38DAEA1CB | 0B0E25BB4 | 1972B37E3 |
| 94 | 3EF1F9EF4 | 189D8C3E0 | 1941998D3 | 259838BC9 | 28E545988 | 33BFC60D8 | 3572B10F3 | 197913B6B |
| 95 | 24CF96D66 | 285347801 | 22BC70E5E | 394231BCC | 077583F4E | 0364420AF | 278FBF5CB | 3850AFC8B |
| 96 | 1B38C4A50 | 04439E0B5 | 3A7BEB18B | 3003A36CD | 329D5A2B6 | 1BB123AFA | 049C2CC94 | 0F604D1DC |
| 97 | 28D47EF33 | 24CF66B6B | 24B716FA9 | 34ED7F6BB | 186AE44B4 | 1380D0726 | 1CC51324E | 16BA74F62 |
| 98 | 04422E60A | 3424BA16C | 3FF1B39DD | 1A1E658F7 | 33457317D | 14E822151 | 3EC02F279 | 28593D11D |
| 99 | 0F2DF0912 | 21BBFA838 | 32D634EBF | 2061148FD | 09A565B74 | 2BCE430B7 | 34DAAD9FA | 228ADAFE5 |
| 100 | 2D7EE0544 | 25D57B7CA | 0FADAF20D | 19B4F6444 | 3A75DF1C1 | 0AD3EDD56 | 0A4D61EEA | 28C1262A5 |
| 101 | 1B6AEE253 | 0BFE02772 | 24AB19547 | 186A377A5 | 03089B4E8 | 128955F60 | 3A8DA9AC8 | 2931648B3 |
| 102 | 21BE0200F | 00F34B4F5 | 34FF3261B | 1A0E27AED | 0A821AEFB | 21B0BA404 | 1C6A644A4 | 1734EBB33 |
| 103 | 201FBFD73 | 0592E9D86 | 053D87C9D | 3CAFC7479 | 22F1BA3FA | 3DB25DD15 | 31D468990 | 22FF2B539 |
| 104 | 06C77404E | 18AE64252 | 3963D899A | 37179C03C | 0FD2E3D04 | 191E64DBB | 380B841FB | 368E1DEAA |
| 105 | 3A561759B | 156243DE8 | 04325D217 | 33993D0B0 | 0CEAC2109 | 002242D1B | 33C1D9F5E | 1EC4195D3 |

TABLE 5-continued n = 1 (Segment 1):

| q/blk | A | B | C | D | E | F | G | H |
|---|---|---|---|---|---|---|---|---|
| 106 | 17D7A9B74 | 1F44ABA75 | 17B572FE3 | 096008B9B | 1F1E00AAE | 05489F7A1 | 17A4C131D | 1C018E923 |
| 107 | 0A4ACCEC8 | 1F294A30D | 19CAEE64E | 002787A1B | 03EB3238D | 27C10F626 | 1C9E656A0 | 3F73609F0 |
| 108 | 1E0E3C802 | 1B52D12AA | 2F4E003B7 | 23BA7A6F1 | 3CAA0998A | 32E96C916 | 168EFA1EE | 28147EE33 |
| 109 | 1CEC9799E | 215D9302B | 176BB6639 | 003D5E371 | 12FE4ADB3 | 3106B64E2 | 001D9C28E | 0F39059DC |
| 110 | 31570792D | 2260D7FEF | 1AC830374 | 118FE7C78 | 08F982159 | 23BB2B13A | 2C7944305 | 376396F3C |
| 111 | 2D340540B | 272E94D06 | 097C70995 | 0E70DDADA | 1DBD644E5 | 341A72A58 | 01CBF5334 | 2C7999AF9 |
| 112 | 3FF17764D | 0701DFAD3 | 146BDBB97 | 229D2D7F0 | 03C5DA21D | 3A5916EC7 | 2390AC01D | 197D64233 |
| 113 | 3E9759D5A | 00B237425 | 0B7E646B9 | 190CB4D16 | 2646AA1D4 | 1A373103D | 337E5EFB1 | 0199DE4A1 |
| 114 | 3FD5ADE8A | 26B843860 | 0A2D0AA7B | 3C351E07F | 1B25376AE | 05C553CDD | 1DBC3F38D | 019823A2A |
| 115 | 30FF187B4 | 112F9D7A1 | 1AE977517 | 3760AF555 | 004F86368 | 3700975C2 | 0518029DE | 032427D9B |
| 116 | 3A86D49BB | 057E649D8 | 2FDE33D7E | 31254217C | 30E05CE12 | 10BCC1CD7 | 1889C5139 | 38A163ECF |
| 117 | 2610F5174 | 02A7ACB27 | 208B84FF0 | 14609CA80 | 0F3526318 | 38EBC7384 | 287C57BAA | 279661A9C |
| 118 | 014F6D77B | 1036B3D2C | 294F1999A | 33A059187 | 26CCE0507 | 180DF3129 | 00A6CAE22 | 2AC0F23A2 |
| 119 | 347C62997 | 1912A710D | 2260D531F | 2F54BBEBB | 0A2D90305 | 1BBEE20E4 | 0AF79997E | 2376F3D0F |
| 120 | 04484EB82 | 181977944 | 1C1CC2693 | 227ECAB0F | 23F32982B | 19E2F290C | 1BA2300F8 | 0EFB06247 |
| 121 | 0EC048AD8 | 3B2168495 | 34FC02DA1 | 2C0CDEF52 | 0553CA222 | 25DFA4581 | 29CF66B6B | 0AB9C21CD |
| 122 | 2AF502148 | 3B00632F9 | 387CDC4BF | 3F8B9F716 | 19084CD65 | 0354918C7 | 39D1FD9AA | 0F5ABDB77 |
| 123 | 2C6E2557A | 3E8A19D6B | 3E6756A28 | 237E6E5BF | 24CA57004 | 1D52401AD | 0237F1D80 | 0FB2B335D |
| 124 | 228F4B540 | 07532BF5D | 101F67F52 | 29D8598EE | 0421A0E23 | 2D89C2AFF | 0963D2F3B | 24C472A63 |
| 125 | 0CF3598E8 | 196A40BD2 | 00E63B26D | 088A0BFCA | 1C78E9016 | 03835236C | 33071A836 | 3949DC586 |
| 126 | 3E815D747 | 1588D4E96 | 073C8D44A | 303281AE4 | 095D31EC8 | 1F10F69DC | 200F057D8 | 1F270128F |
| 127 | 34F9ACB6B | 384870FF1 | 257A863DE | 34B36BA0F | 3FA3D216B | 27425041B | 0E0DD0BAD | 2E95AD35D |

TABLE 6 n = 2 (Segment 2):

| q/blk | A | B | C | D | E | F | G | H |
|---|---|---|---|---|---|---|---|---|
| 0 | 13F99E8EC | 3CF776C2A | 3300A482C | 0B2BF4791 | 17BECDFE8 | 35998C6D4 | 05F8CB75C | 259B90F0B |
| 1 | 116913829 | 05188F2A4 | 2DB0A8D00 | 2F770FE4A | 185BE5E33 | 0F039A076 | 212F3F82C | 116635F29 |
| 2 | 004EE1EC6 | 18EF4FDD9 | 26C80900E | 1A63FB8A7 | 1DAA917D4 | 0E6716114 | 02690646D | 0CC94AD36 |
| 3 | 06D4FF377 | 2716E8A54 | 16A1720C8 | 08750246F | 393045CCB | 1DBCCDE43 | 114A0CAD6 | 181690377 |
| 4 | 3DC4EF347 | 1F53452FC | 01584B5D3 | 11D96034F | 1FA62568E | 11974FACA | 191BE154D | 397C9D440 |
| 5 | 05A1B6650 | 29835ADAD | 2F6DDABE4 | 0976A607B | 11BA92926 | 2456B1943 | 3E3FD608B | 095E7584B |
| 6 | 00CC66282 | 0560BE767 | 21EBAA7C6 | 2D8E9ACE3 | 198A9E285 | 05F3E73DD | 13DA751A2 | 176B75E43 |
| 7 | 03D08ADC1 | 2254606FC | 3C695D892 | 1DA9E0280 | 2CD4FF589 | 19B78A5A4 | 0CE67A7C6 | 12535A61C |
| 8 | 0984647CF | 0822BA46B | 3EB2BC076 | 212596F54 | 11CC2E64E | 120BADF9F | 0DA72CEDE | 30D0E106F |
| 9 | 083CE5726 | 1F05DA925 | 169D93EF6 | 1FCADF3D3 | 08A5CF0BC | 317C8508F | 19BDCCFE7 | 0FACE3631 |
| 10 | 27583A466 | 1CB1634D5 | 03C7849F7 | 38C6CED00 | 1161C173A | 15A645D3E | 281A7ED92 | 076ADA797 |
| 11 | 33BA1AE8F | 187F578EE | 32473D69A | 2458B703B | 267E59071 | 0F317883B | 3E7DEDBF1 | 3B9859BA7 |
| 12 | 0322609A3 | 20C4C957C | 3FD638746 | 3FB716D79 | 36BD0CF1C | 333B11B8F | 0027ED1F2 | 3E7471BF3 |
| 13 | 3529922B1 | 0ECECBE04 | 1980B9B9E | 38D60363F | 18904BCED | 108E3E5F1 | 34B95C446 | 338F51DAC |
| 14 | 21FD50527 | 0EA2F7A31 | 1E294A159 | 114734A02 | 120B90BF3 | 3F3617C92 | 0129071E2 | 106640936 |
| 15 | 2B59354BB | 275BF9761 | 39C6FF332 | 2004B3902 | 053F9DCB0 | 19D79A902 | 2B3125038 | 20649B43E |
| 16 | 03A8A7A2B | 091AE6721 | 18651FD9E | 1F5415ECD | 1B38EA62E | 07FB0F422 | 3EB58896B | 077FE4C7C |
| 17 | 06A13CB38 | 340099B18 | 2AE6D6385 | 1669631F9 | 28E51A676 | 19A023391 | 261855F39 | 3E518F0BC |
| 18 | 2A88F831B | 09D295831 | 294C468D7 | 1477F0A13 | 37725C6EB | 00E7DB222 | 27D610157 | 349A8FAB6 |
| 19 | 163E1C44D | 3F98B6F4A | 1805538DD | 01EE3DB4A | 22AA1797E | 27568753E | 16090F219 | 2C9838C01 |
| 20 | 34B0543DC | 121B8EA82 | 00873B4A0 | 220FE7C05 | 2EDBEAE34 | 1104BDB93 | 0711E8C0E | 0E1C107BD |
| 21 | 226183AFF | 15643DE71 | 04A4CDECB | 2E67FDF8A | 26D2A6D40 | 25E7695F1 | 1A99778F5 | 20FE0C1A3 |
| 22 | 0F7EAC09D | 12BB72B2A | 182E44301 | 2962EB85A | 3477C1B69 | 3E3CF56F7 | 29C9D0C6 | 39788600C |
| 23 | 31084BEB5 | 1DC90E345 | 391736CC1 | 3C8292AE1 | 38A0D515C | 3977012F6 | 25D1F6055 | 36A7D3F8B |
| 24 | 229D3ABAC | 1044BA05F | 0C391B88A | 0636A90A6 | 0B14322AB | 21ADC33E4 | 2DC1A3BFE | 0D7FF6D1F |
| 25 | 33C85B393 | 37BFA31B6 | 134F872F0 | 0C5EA36E1 | 286956ED1 | 1632092FA | 382B4BB10 | 23DC3EF14 |
| 26 | 38E8B9BF6 | 0A0CE666B | 207D98054 | 23FF360AD | 121BFDA4E | 347D442FD | 242922C07 | 23C6E4115 |
| 27 | 263EA8516 | 36138BD6A | 0ED9C55E7 | 3F0937876 | 03232BC24 | 18E5FFF26 | 3530CF206 | 3981B7414 |
| 28 | 1D9AC2E79 | 051B220E9 | 3F3B09EC8 | 0D3F6C366 | 0201A7CB9 | 3D5477092 | 22185FF9F | 1C5AA5348 |
| 29 | 208D85694 | 22104E7C5 | 14BCFD3DD | 3592DF665 | 1F4EC3265 | 24358076A | 2D20A8000 | 017F2D489 |
| 30 | 36B3A9A2C | 3F8E0F162 | 13ACDCCF2 | 16951F727 | 271E73555 | 1B3EDCDE7 | 162B45352 | 1CAFA635A |
| 31 | 2D30FE705 | 3EC9BFC8D | 1B10F8349 | 34F973F31 | 1CA96A349 | 1A28B4543 | 1C5367CE6 | 2DFAB0AE7 |
| 32 | 21D93EB5A | 0E49D6211 | 3C6FCF774 | 09F44CACF | 2D8CD2BEA | 037DDAD3D | 3BBD06D1D | 39CBB996F |
| 33 | 159B1F948 | 0183E8DCD | 3A484866C | 21F8DF1A5 | 219A58193 | 2D1B3C399 | 2275F19BA | 0EFF4C612 |
| 34 | 22EB93A82 | 15047E272 | 15428D77B | 38FFC612E | 20609BE54 | 3226C8254 | 3E5568DB2 | 159284EED |
| 35 | 34529707C | 2E84585F4 | 20DFFB4C5 | 28288AA00 | 10EFC1E07 | 3C4D211FC | 379087C3F | 25716A7DD |
| 36 | 20106354F | 22AEB9FD7 | 3A6BAC67D | 3126294C6 | 0FBC874AC | 2DFE5675A | 391B1DDAA | 06BAA74D8 |
| 37 | 348F831C5 | 2E44BF3C2 | 3D9F6F454 | 20746A30E | 08D183029 | 35C6BFEA7 | 2729B552B | 263BB2EBD |
| 38 | 202D7F08F | 0DBE1C144 | 132F4EC09 | 184CD9B93 | 2596F5884 | 2A55B8217 | 2BEAE02D8 | 235A19A43 |
| 39 | 2DDE3FF5F | 23932555C | 001ED92D7 | 22FCD3D60 | 2C0737593 | 0B27E62FF | 0693CFBDC | 284D5B33F |
| 40 | 1DB9AB8E9 | 2995EE0A1 | 1ACFE9892 | 0D41BCB9D | 2E3806507 | 25CCD5D60 | 3536DF04C | 0BB0A5E3B |
| 41 | 3FFD4DD82 | 3E69CC1C1 | 2BC30FB74 | 3462F70FC | 164FAE762 | 09B83F8AD | 1DF593F3C | 2DB478034 |
| 42 | 16E24E9B6 | 0A9FCFBD2 | 3A018544C | 1ED8E2855 | 0037681E4 | 05950E1F8 | 1107DA097 | 377A25C65 |
| 43 | 03C9318B8 | 0C70A7749 | 0D58708C2 | 0CA2808C4 | 219E02554 | 39315B2F2 | 2E089B00F | 302E135C7 |

TABLE 6-continued n = 2 (Segment 2):

| q/blk | A | B | C | D | E | F | G | H |
|---|---|---|---|---|---|---|---|---|
| 44 | 04DC211E8 | 1DD20A505 | 21A50649F | 2CA438C04 | 39CAD66AE | 2E1BD969F | 002748760 | 069924211 |
| 45 | 2E84BCF09 | 226F5D43C | 37BE7EB10 | 07CDC854A | 06FB50D48 | 08966435B | 01BA5E5D2 | 1D34057FA |
| 46 | 2D8DFD565 | 0A30D633F | 33F93B7C6 | 0B330E9D2 | 0E659B262 | 130669024 | 19A9D5F64 | 38059132D |
| 47 | 17E4777AE | 1308F9046 | 2F7C0483E | 1859E0943 | 0982C9101 | 05453D92C | 001F53877 | 388A571AB |
| 48 | 00D29CC63 | 0A6D3BDED | 1CA44D2AF | 388C002CA | 2A3D70EF7 | 2DD3F5A6F | 39FEAF0B6 | 11DFE385F |
| 49 | 3E3A6CEC4 | 122F5E8BE | 360B96301 | 0632CF244 | 2E8985A9F | 0FD256C87 | 0449C29D4 | 26B713C90 |
| 50 | 238150687 | 3D96F7F7B | 0091E6D18 | 21802352A | 02F7A466E | 0A5BB6648 | 350DA85DB | 1C97F4544 |
| 51 | 306BA76DE | 379A88697 | 3F0DA31E1 | 0EBF48C71 | 27F8A46EB | 3F75A19F6 | 277002F97 | 275B43715 |
| 52 | 24D946CC1 | 38DF102DC | 3EFE1F5B3 | 3C316E148 | 2735B20CF | 0688E430F | 0316DC923 | 24919BEA1 |
| 53 | 0EEAF72D2 | 3C7248573 | 1087A7BD6 | 08EDA9BF6 | 2B5D97BF4 | 26733DC60 | 1190D275B | 2EC7ABD30 |
| 54 | 37C6AB63E | 2FFC9C790 | 02CAA37A7 | 1B34A3F84 | 0022CD5F6 | 3ECF891BF | 193D545E2 | 0172C674E |
| 55 | 0848A41C3 | 1D8150EE7 | 3D8A8549A | 2595F707B | 00640B276 | 2D44EBDAE | 1CAF37453 | 377EF590A |
| 56 | 16B7A5F7D | 1F5AA7998 | 382300A8B | 218916E53 | 19D00E728 | 1EDA11790 | 0BBDEF9C4 | 1DEB15796 |
| 57 | 3EFB3368D | 392AA88AD | 29CF3CACD | 03F59ED8A | 1042098CA | 1721B8F3A | 2B5DE9312 | 0CB5E6F23 |
| 58 | 1A8B0FB9E | 3FBC09C8B | 3D7F3E248 | 034C9BCB5 | 1BDD89300 | 3392476C0 | 0C10AED4B | 23BECA42A |
| 59 | 0EBC749B6 | 33453C7F6 | 304735F5C | 334628143 | 1DAF6E7A9 | 11BB9C393 | 226C5E4FF | 170372039 |
| 60 | 3F9262CBC | 0693308C8 | 21B563415 | 09BDCC403 | 0112C79D4 | 2DA9F1134 | 36AA1CD7D | 3A1608BFC |
| 61 | 218AC590E | 0FACC734D | 02132C9A3 | 27087557E | 076B3ECE7 | 2EA16BA3D | 0E1D452F1 | 3F70B027A |
| 62 | 004F9DC68 | 25BE3AD9C | 2CBD3C07B | 3F9DECD71 | 3E771E15A | 11FF2F24D | 2AEA5DF67 | 1E838955D |
| 63 | 3A04BC376 | 1D19254F1 | 00F92DD2B | 3C57484F3 | 181D0973E | 319F9CEEA | 053ADEEDB | 1A3C22150 |
| 64 | 0F78BA6BC | 2DFE0E681 | 3035BD77D | 0A0FFD148 | 275F50C66 | 2246E9053 | 27B2BF3E9 | 1741894F8 |
| 65 | 1ACCD0F79 | 22F0AEA4F | 32796ADB5 | 134A4A876 | 183B989E3 | 204C4BF97 | 22300E86F | 3F18744A3 |
| 66 | 3EB6E19EF | 1B24EAB88 | 2E318F810 | 3F07B618E | 26B4C0C87 | 31CC10EA8 | 169E1B650 | 017DF88ED |
| 67 | 2BD9E8FED | 0AB104122 | 30C9D81A0 | 09EA73C7F | 141357B1D | 000A7DB48 | 1DD06FD41 | 0AFA8EF72 |
| 68 | 19CA5678F | 28A89AA43 | 1B8945917 | 262AF69C3 | 3145A4473 | 3742CBFF5 | 1BCD965E9 | 1B0E7FC84 |
| 69 | 077838B25 | 2BF7032F8 | 23DC2E014 | 028544277 | 37B411B5F | 392FF6CDC | 1D66F2BE9 | 011372DA0 |
| 70 | 39596216C | 05A651F63 | 183A6AE26 | 0D1FCA203 | 0FF6F0D22 | 2FEB8364B | 05A438ED8 | 32D045F13 |
| 71 | 3711AD513 | 290B237FF | 20E2A9B26 | 0C72A0234 | 2F1ABBE93 | 19B505378 | 354ED915D | 0C359F272 |
| 72 | 1D7786BA4 | 1CCDF053A | 36828B333 | 0ED27AFB6 | 241326FC4 | 1A9C37F8B | 0A9C3C372 | 05937E898 |
| 73 | 1053B9CDB | 040B97B1D | 0D4FF481D | 23AD465A8 | 2906EBDE2 | 0C4F6C09D | 2189C5FEA | 2D90D305A |
| 74 | 39073122B | 35FEAA236 | 1B38B7A90 | 2E02AB9F7 | 219FEEA0A | 36B3B2EF8 | 39A3F4C8B | 15A42C9DD |
| 75 | 2C6326A9E | 33F7536C1 | 2A120C75F | 37030CAA0 | 3A011882C | 098C8504E | 3B92D756B | 175811CF9 |
| 76 | 38A0F736B | 2BD9E9C32 | 3B989715A | 2A646ADF4 | 2D02FE38C | 11AC7EE96 | 3F5464862 | 0F382B0D8 |
| 77 | 26897D80C | 145B21D3E | 143F5E320 | 30549707E | 28126710C | 122CA92BE | 3AF47270C | 0B544128F |
| 78 | 00E931208 | 2E1E75EAA | 374C36E5F | 21724DFC5 | 1DFCD2028 | 1B3FF774E | 3A826A68B | 1781CDCA4 |
| 79 | 0C3D7268D | 0B7A26BF9 | 1587CE5CD | 1D04E1E60 | 36240C07D | 1AC403449 | 0417F9622 | 02B9F8BED |
| 80 | 1B569F488 | 08A3F3A46 | 377F03A18 | 2DE416045 | 1ED96E381 | 33F4F16DC | 2C8DAAE4F | 33E384AC7 |
| 81 | 13F709786 | 02A4E32CB | 14C7F849E | 09EA16987 | 06C89A4A4 | 219E4B995 | 243CB7F07 | 253513BC6 |
| 82 | 09B83FDF2 | 119D60439 | 278290BFF | 2483E6F2C | 0EDEC175D | 242A669C1 | 3EB639EF0 | 31EBB4CA0 |
| 83 | 22CAEF0E4 | 0B2FCDED0 | 19BA79607 | 343F81C7B | 289AA213E | 358AC9FFA | 23956ADA1 | 00BC725E7 |
| 84 | 1186F95E3 | 2F95F4048 | 3CFBF41E2 | 1D1E4BE96 | 26B38BA65 | 2F715E590 | 2235C0029 | 2C89AF93F |
| 85 | 33437ED6C | 12F14DB69 | 2E70F5611 | 183752704 | 142BE3B34 | 3B90ECD86 | 1C11EB493 | 1022D4782 |
| 86 | 248457F60 | 05B9A28A5 | 0A2A5DD56 | 16002D9E7 | 34C87FB16 | 2E32BAE0C | 21065BD64 | 1CCE92BB0 |
| 87 | 1DCE3941A | 1D940ACE3 | 30D331B98 | 3D5A3BAB6 | 119791607 | 10FB0D788 | 2C78E9015 | 100B598E4 |
| 88 | 39C0BC811 | 1B886594E | 27AF50C73 | 2DCEA05E6 | 0805EDCA9 | 3A5989B08 | 18AD24255 | 1683B7CF2 |
| 89 | 186A3D233 | 09E8B95DA | 1ED9FB06E | 1B19A74F8 | 356CA7443 | 316C9FBE9 | 3F8A3162A | 3A0BC11CC |
| 90 | 02F039B63 | 2F02D3E75 | 0F5B5E89E | 3D062255C | 222C6AA4E | 25DEA06FB | 39488C071 | 139318BFB |
| 91 | 27B5B6EE8 | 22154E0BD | 3FF7729F1 | 1052B1947 | 3D477BF2B | 3EDB6745A | 1B30CF849 | 030F84AF4 |
| 92 | 27B2D40BC | 01EE5E9B6 | 24B0ACF84 | 3370F65E0 | 067D8DFA9 | 1C01B9327 | 26FF8FDB5 | 3809C0CA6 |
| 93 | 11F581193 | 07B9B7A7D | 1CA56B4A3 | 3D088CC6C | 11D52C38A | 344760F0A | 3D3AA336D | 0118CDD93 |
| 94 | 096990784 | 2960D1672 | 3BFD7D847 | 2BC297EEE | 32168CF28 | 3912FFF6C | 08ED9BAB1 | 34452C6E5 |
| 95 | 02CD48DC2 | 186403849 | 24C6EE1EA | 12ED5268A | 2718C00E9 | 27E8F18CF | 145913E2D | 0B09009BB |
| 96 | 06B97DD08 | 2880C9B96 | 37EB87E03 | 14C4ED01D | 17041E5DC | 347A412CB | 088CE591B | 0BE926B22 |
| 97 | 116250DF7 | 174584329 | 1102B7903 | 1CA549C5A | 25244AB6C | 374E0F1B9 | 274F76015 | 0FB738F16 |
| 98 | 12841B9E9 | 1F9C4AEEB | 1445F0C98 | 39FFB6307 | 02AB688E7 | 0FD8B499E | 28D533072 | 138F162EA |
| 99 | 22BD9525E | 2030E58C6 | 25F2CD033 | 157D93437 | 1442E92D2 | 3D6EE9DF3 | 3CA5B469D | 0588A0FAE |
| 100 | 0FDEC177D | 2606157BE | 2224E556C | 0C6F33897 | 0F830DE1B | 3C3F9C1D8 | 2AF576923 | 0D4173E27 |
| 101 | 376EF82C2 | 30E3C582E | 0A82DE29A | 1B8D454D9 | 079ACE6D9 | 2579984C6 | 392F28400 | 24CEAEDF1 |
| 102 | 1CD4AA9D2 | 1DD6F4DA5 | 3485B7150 | 105DE02F9 | 22168E0FA | 24F48AA6C | 003771A39 | 306890843 |
| 103 | 1F8303786 | 2C981AAE4 | 0819F22E9 | 0A1D88D55 | 3B4C012FD | 0214CDF52 | 19DF3BE8F | 02364E19A |
| 104 | 1364A15C0 | 16E9F9961 | 17E598810 | 2654E5A2C | 09B43C7C8 | 3A5E2AF45 | 14FC71E26 | 2B4BA69F4 |
| 105 | 12E128BEF | 19166342E | 04A1404B7 | 283D17B66 | 014836F64 | 13BE0B4B5 | 2F8583C08 | 2B19A7FB4 |
| 106 | 19F83FDE2 | 361D25170 | 36354011B | 3FF4EC74B | 1B2128F79 | 0C849EB1B | 096B991D8 | 1CA7A74AA |
| 107 | 32E0BEF35 | 11A61714D | 34C56B40B | 0742C52FE | 00ED2F1C4 | 3997FC7B7 | 06E414374 | 180DCD64F |
| 108 | 18399ED59 | 224E6C2FF | 3450F1BB7 | 27A1CA959 | 21B5E00F8 | 13B67DAE8 | 0B14C022E | 0E41BBEE2 |
| 109 | 318D94D05 | 2EBB53B17 | 331C3E6F4 | 0FBCD71ED | 380FF18B8 | 3E3C75B26 | 0E0088A18 | 17553D2A2 |
| 110 | 37AC7E5D5 | 27C9EADFA | 3FC47B5E4 | 38699BB57 | 1564F8B27 | 3579C7FEB | 13401BD88 | 0DB519DE0 |
| 111 | 0FFD6F22 | 3C84242F3 | 2DEAE40AD | 305F320A5 | 244CB97B0 | 0892DA905 | 3F09D5CB5 | 332E7DB02 |
| 112 | 31479E580 | 1B6AD13E0 | 16A1CF9E2 | 33A0A119A | 1AC8388E9 | 3D4105F37 | 226501835 | 27AF1310F |
| 113 | 1CBDAFE39 | 3E5A30C1C | 236E9A029 | 063430D97 | 0CD91A825 | 02F335D7E | 1989FE0BE | 13C4E2A20 |
| 114 | 10B393370 | 33CB79316 | 2CEB44FC0 | 236019420 | 248F95ACB | 35034B6F0 | 365691771 | 34A8FBCB6 |
| 115 | 25463FC5F | 082FC0ED2 | 038ACEICC | 3E959B49D | 21B8C04F5 | 08633F3A0 | 3A5D18159 | 12B3EC4C7 |
| 116 | 167B32C3E | 06FF88387 | 34C3F468B | 3239005B2 | 121C913AF | 21C90CE16 | 28B54D557 | 3811CB0A9 |
| 117 | 221BD0503 | 0AF619499 | 21F8D40C1 | 1B3DA7AEE | 3FA2E3B05 | 348466C50 | 10F12A28D | 0E70B26AB |
| 118 | 1D79A57C5 | 315D2460F | 1402B8222 | 28DC66FEA | 1BCF748F9 | 2AD5D4227 | 0094D2CAD | 25EA22A58 |
| 119 | 062B39CFB | 310E8818D | 0F2D0A235 | 3F6468866 | 33F86F342 | 39CAB5BBC | 2E7D6A8BF | 3E9218162 |

TABLE 6-continued n = 2 (Segment 2):

| q/blk | A | B | C | D | E | F | G | H |
|---|---|---|---|---|---|---|---|---|
| 120 | 2FCDEA0E0 | 1BDD766A4 | 2827B99BB | 0B5F04CC9 | 1C9E02A9A | 1A6675ED4 | 033497A06 | 07D4ADD44 |
| 121 | 3CD46CD9D | 311A64A85 | 24DDFE6FF | 341106FE5 | 0D0613CDA | 0E9276056 | 178ACC4F8 | 23DEA3CB0 |
| 122 | 2762D6A40 | 306FE3843 | 1402589C8 | 382B07654 | 160BA3DEA | 3815B54C8 | 273960105 | 2076A15E5 |
| 123 | 1C593A744 | 1562487F6 | 0C38617B4 | 2CA68266A | 071C4BF93 | 2593F0BDC | 1562436E5 | 199BEEA49 |
| 124 | 35B8C7503 | 278F57EAA | 34A804061 | 19C657A74 | 385734710 | 3FAC27628 | 0707BED4E | 32F20F45E |
| 125 | 34994C46C | 1C6B99499 | 1AF24D850 | 11AD795D3 | 19288BFE9 | 1360C1B96 | 3B5D8DBC0 | 2554E72D6 |
| 126 | 22D7095A4 | 34B70502A | 3F0CB27D2 | 04FC214E6 | 24C0B80C5 | 03D6F4DC8 | 1432A099E | 26300D70E |
| 127 | 21C33416F | 18B894695 | 3AC062614 | 3537CF601 | 00A20A8B8 | 1CD10BAF5 | 394DF1DC0 | 0925851ED |

As mentioned in the foregoing description, the SA-preamble is used to obtain a cell identity and to determine a corresponding ABS type. This is explained in detail as follows.

First of all, 256 cell identities are partitioned per segment according to an ABS type. In particular, partitioning is performed per segment in a manner that the sequence index q ranging from 0 to 85 in Formula 3 corresponds to a macro ABS (advanced base station), that the sequence index q ranging from 86 to z corresponds to a public ABS, and that the sequence index q ranging from z to 255 corresponds to a CSG (closed subscriber group) femto ABS.

In this case, since a mobile station is already aware of a type of an ABS which will be accessed by the mobile station, the mobile station detects a matched sequence in a manner of comparing auto or cross correlation of an SA-preamble sequence received from a base station to auto or cross correlation of SA-preamble sequences corresponding to cell identities existing within the specific partition. Consequently, the mobile station obtains a segment ID n and an index q value from the matched SA-preamble sequence and then determines a cell identity by Formula 3.

Yet, referring to Tables 4 to 6, 128 SA-preamble sequences are determined per segment only. The 128 remaining sequences are extended from a mother sequence by the complex conjugate operation of Formula 5. In this situation, if a cell identity is determined by Formula 3, a cell identity is mapped to an SA-preamble sequence as a contiguous integer value irrespective of inter SA-preamble sequence relations and the mobile station has to compare SA-preamble sequences corresponding to al cell identities existing within the specific partition to the received SA-preamble sequence. Therefore, it causes a problem that detection complexity is increased.

According to the present invention, instead of using an SA-preamble sequence index q of 256 SA-preamble sequences per segment, an SA-preamble sequence set (indexes 0 to 127) of 128 SA-preamble sequences shown in one of Tables 4 to 6 is extended to generate an SA-preamble sequence set (indexes 128 to 255) of the 128 remaining SA-preamble sequences. In this case, the present invention proposes to determine a cell identity by Formula 6.

$$ID_{cell} = 256 * n + Idx \quad \text{[Formula 6]}$$

In Formula 6, the n is an SA-preamble carrier set index, has a value set to 0, 1 or 2, and indicates a segment ID. The Idx indicates an integer ranging from 0 to 255 and is determined by Formula 7.

$$Idx = 2 \cdot \text{mod}(q, 128) + \left\lfloor \frac{q}{128} \right\rfloor \quad \text{[Formula 7]}$$

In Formula 7, the q is a sequence index, includes an integer set to 0 to 255, and is obtained from an SA-preamble sequence.

In order to cope with various ABS types, cell identities are partitioned per segment according to an ABS type and are then mapped. In particular, the partitioning is performed in a following manner. First of all, the Idx (0 to 85) of the cell identity per segment corresponds to a macro ABS, the Idx (86 to z) corresponds to a public ABS, and the Idx (z to 255) corresponds to a CGS femto ABS.

Figure 11:
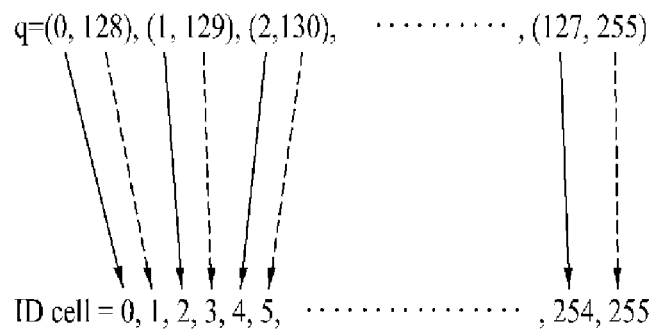
FIGS. 11 to 13 are diagrams of examples for mapping a cell identity and an SA-preamble sequence to each other according to an embodiment of the present invention.
Figure 12:
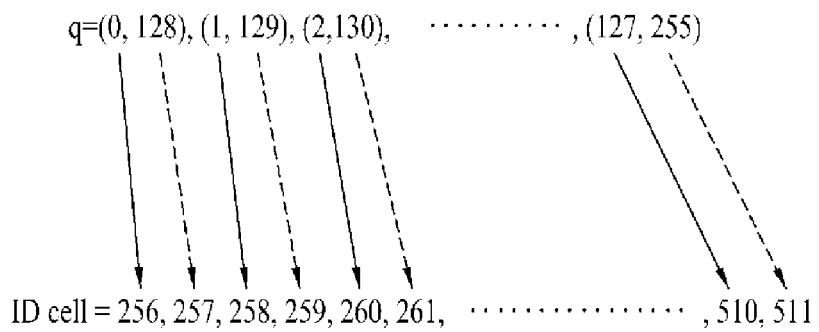
Figure 13:
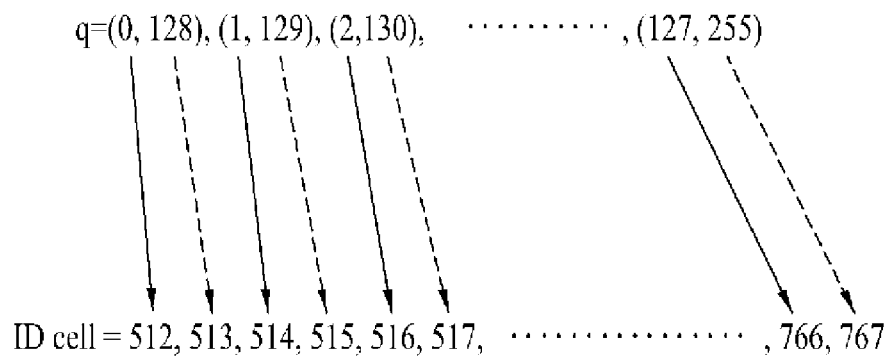

FIGS. 11 to 13 are diagrams of examples for mapping a cell identity and an SA-preamble sequence to each other according to an embodiment of the present invention. Specifically, FIG. 11 shows a case that a segment ID is 0, FIG. 12 shows a case that a segment ID is 1, and FIG. 13 shows a case that a segment ID is 2.

Referring to FIG. 11, it can be observed that adjacent cell identities 0 and 1 correspond to SA-preamble sequence indexes (q) 0 and 128, respectively. It can be observed that adjacent cell identities 2 and 3 correspond to SA-preamble sequence indexes (q) 1 and 129, respectively. And, it can be observed that adjacent cell identities 254 and 255 correspond to SA-preamble sequence indexes (q) 127 and 255, respectively.

Meanwhile, an SA-preamble sequence of an index 0 lies in a complex conjugate relation with an SA-preamble sequence of an index 128 according to Formula 5. Likewise, an SA-preamble sequence of an index 1 lies in a complex conjugate relation with an SA-preamble sequence of an index 129. And, an SA-preamble sequence of an index 127 lies in a complex conjugate relation with an SA-preamble sequence of an index 255.

Hence, in case of partitioning total 256 cell identities per segment according to an ABS type, an SA-preamble mother sequence and an SA-preamble sequence complex-conjugated with the SA-preamble mother sequence exist within the same partition. In this case, a mobile station pairs an SA-preamble mother sequence with an SA-preamble sequence in complex conjugate relation with the SA-preamble mother sequence and then compares the received SA-preamble sequence with the pair. Therefore, it is able to decrease the sequence detection complexity into a half as low as possible.

For instance, assuming that an ABS type to be accessed by a mobile station is a public ABS, the mobile station compares SA-preamble sequences corresponding to cell identities of Idx 86 to z per segment to a received SA-preamble sequence in order to detect an SA-preamble sequence that matches the received SA-preamble sequence. In this case, since the SA-preamble mother sequence and the SA-preamble sequence complex-conjugated with the SA-preamble mother sequence coexist within the partition of Idx 86 to z according to Formula 6 and Formula 7, the mobile station pairs an SA-preamble mother sequence with an SA-preamble sequence in complex conjugate relation with the SA-preamble mother sequence and is then able to compare the received SA-preamble sequence with the pair.

Namely, by the cell identity determining method according to the present invention, in case of determining whether a sequence of a sequence index 0 matches the received SA-preamble sequence using the auto or cross correlation, it is able to determine whether the sequence of the sequence index 128 matches the received SA-preamble sequence without using the auto or cross correlation. So to speak, without calculating the auto or cross correlation for an SA-preamble sequence corresponding to every cell identity, it is able to detect a cell identity by performing a procedure for calculating the auto or cross correlation on a half of an SA-preamble sequence only.

Likewise, referring to FIG. 12 and FIG. 13, 256 or 512 is added to a cell identity according to Formula 6 only. And, an SA-preamble sequence in complex conjugate relation with adjacent cell identities is mapped in the same manner described with reference to FIG. 11.

Figure 14:
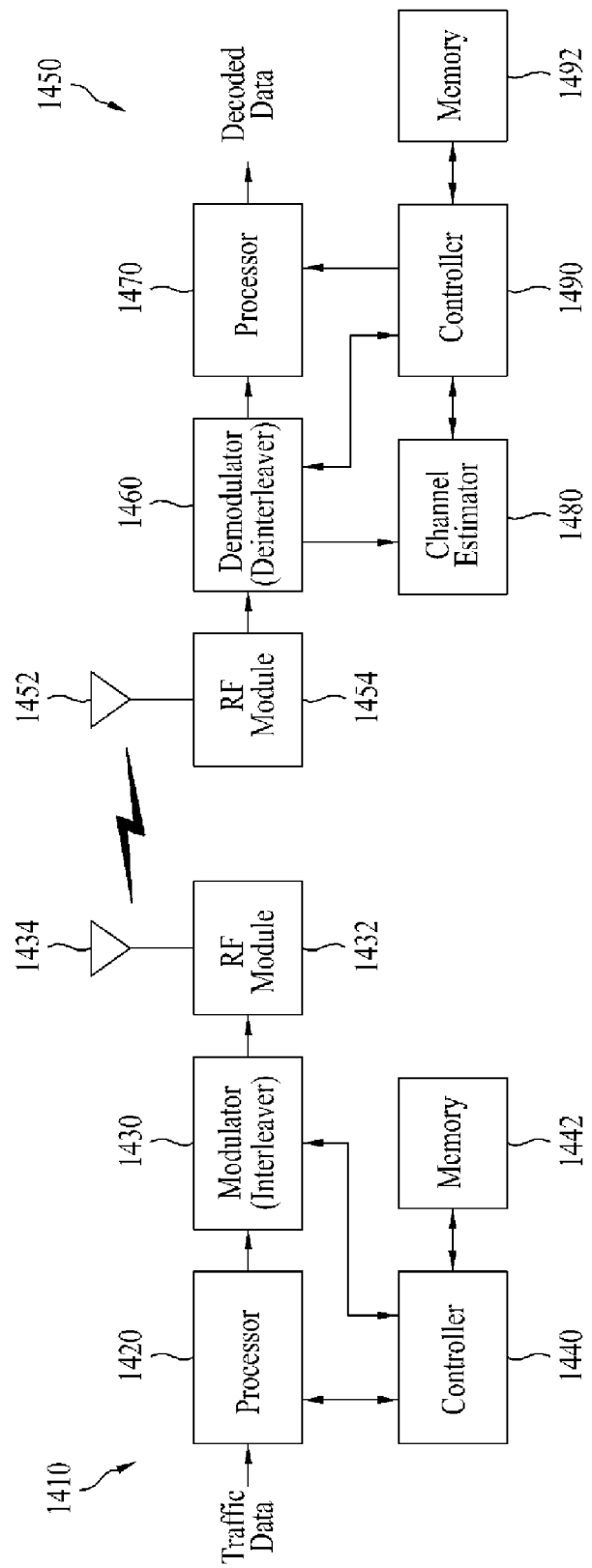
FIG. 14 is a block diagram of an example for a transmitter and receiver according to one embodiment of the present invention.

FIG. 14 is a block diagram for an example of a transmitter and receiver according to one embodiment of the present invention. In downlink, a transmitter 1410 is a part of a base station and a receiver 1450 is a part of a mobile station. In uplink, a transmitter 1410 is a part of a mobile station and a receiver 1450 is a part of a base station.

Referring to FIG. 14, in a transmitter 1410, a processor 1420 generates data symbols by performing encoding, interleaving and symbol mapping on data e.g., traffic data and signaling). And, the pilot processor 1420 generates pilot symbols and then multiplexes data and pilot symbols with each other. A modulator 1430 generates transmission symbols according to a wireless access scheme. The wireless access scheme includes one of FDMA, TDMA, CDMA, SC-FDMA, MC-FDMA, OFDMA and combinations thereof. And, the modulator 1430 enables data to be transmitted by being distributed in a frequency region using one of various permutation schemes proposed by embodiments of the present invention. A radio frequency (RF) module 1432 generates an RF signal from a transmission symbol through an antenna 1434 by performing signal processing (e.g., analog conversion, amplification, filtering and frequency uplink transform).

The receiver 1450 receives a signal transmitted by the transmitter 1410 via an antenna 1452 and then forwards it to an RF module 1454. The RF module 1454 provides input samples by performing signal processing (e.g., filtering, amplification, frequency downlink transform, digitalization, etc.) on the received signal.

A demodulator 1460 provides a data value and a pilot value by demodulating the input samples. A channel estimator 1480 derives a channel estimation value based on the received pilot values. And, the demodulator 1460 performs data detection (or equalization) on the received data values using the channel estimation value and then provides data symbol estimation values for the transmitter 1410. Moreover, the demodulator 1460 is able to rearrange the data distributed in frequency and time domains into data arranged in original order by performing operations reverse to the corresponding one of the various permutation schemes proposed by the embodiments of the present invention. A processor 1470 performs symbol demapping, deinterleaving and decoding on the data symbol estimation values and then provides decoded data.

Generally, the processings by the demodulator 1460 and the processor 1470 in the receiver 1450 are mutually supplemented with the processings of the modulator 1430 and the Processor 1420 in the transmitter, respectively.

A controller/processor 1440/1490 monitors and controls operations of the modules existing in the transmitter/receiver 1410/1450. And program codes and data for the transmitter/receiver 1410/1450 are stored in a memory 1442/1492.

The modules exemplarily shown in FIG. 14 are provided for the description only. The transmitter and/or the receiver can further include necessary module(s). The modules/functions are omitted in part or can be separated into different modules. And, at least two modules can be unified into one module.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be, replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the terminal. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the terminal may be replaced with terms such as user equipment (UE), mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Accordingly, the present invention is applicable to a wireless communication system, and more particularly, to a wireless mobile communication device used for cellular systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of determining a cell identity in a wireless communication system, the method comprising:
    obtaining a segment identity (ID) and a sequence index from a Secondary Advanced (SA)-preamble sequence received from a base station; and
    determining the cell identity using the segment ID and the sequence index,
    wherein the cell identity corresponds to one SA-preamble sequence, and
    wherein a cell identity adjacent to the cell identity corresponds to an SA-preamble sequence having a complex conjugate relation with the one SA-preamble sequence.

2. The method of claim 1, wherein the cell identity is determined by the following formula:

$ID\text{cell}=256*n+Idx$, wherein n is the segment ID and has a value set to 0, 1 or 2, wherein Idx is determined by $$2 \cdot \mathrm{mod}(q, 128) + \left\lfloor \frac{q}{128} \right\rfloor,$$

and
    wherein q is a sequence index and has an integer value ranging from 0 to 255.

3. The method of claim 2, wherein the SA-preamble sequence of a sequence index x corresponding to one segment ID has a complex conjugate relation with the SA-preamble sequence of a sequence index x+128 corresponding to the one segment ID.

4. The method of claim 2, further comprising partitioning sequence indexes according to a cell type.

5. The method of claim 4, wherein the cell type includes a macro ABS (advanced base station), a public ABS and a CSG (closed subscriber group) femto ABS.

6. A mobile station device comprising:
    a receiving module receiving a Secondary Advanced (SA)-preamble sequence from a base station; and
    a processor determining a cell identity using a segment ID and a sequence index included in the received SA-preamble sequence,
    wherein the cell identity corresponds to one SA-preamble sequence, and
    wherein a cell identity adjacent to the cell identity corresponds to an SA-preamble sequence having a complex conjugate relation with the one SA-preamble sequence.

7. The mobile station device of claim 6, wherein the cell identity is determined by the following formula:

$ID\text{cell}=256*n+Idx$ wherein n is the segment ID and has a value set to 0, 1 or 2, wherein Idx is determined by $$2 \cdot \mathrm{mod}(q, 128) + \left\lfloor \frac{q}{128} \right\rfloor,$$

and
    wherein q is a sequence index and has an integer value ranging from 0 to 255.

8. The mobile station device of claim 7, wherein SA-preamble sequences of sequence indexes 0 to 127 corresponding to one segment ID have complex conjugate relations with SA-preamble sequences of sequence indexes 128 to 255 corresponding to the one segment ID.

9. The mobile station device of claim 7, wherein the sequence indexes are partitioned according to a cell type.

10. The mobile station device of claim 9, wherein the cell type includes a macro ABS (advanced base station), a public ABS and a CSG (closed subscriber group) femto ABS.

* * * * *